US011269910B2

(12) United States Patent
Shortt et al.

(10) Patent No.: US 11,269,910 B2
(45) Date of Patent: Mar. 8, 2022

(54) METHODS, APPARATUSES AND COMPUTER PROGRAM PRODUCTS FOR DATA RETRIEVAL IN A GROUP-BASED COMMUNICATION SYSTEM

(71) Applicant: Slack Technologies, LLC, San Francisco, CA (US)

(72) Inventors: Madeline Shortt, San Francisco, CA (US); Jason Liszka, New York, NY (US); Ryan Greenberg, Albany, CA (US); Samantha Stultz, New York, NY (US)

(73) Assignee: salesforce.com, inc., San Francisco, CA (US)

( * ) Notice: Subject to any disclaimer, the term of this patent is extended or adjusted under 35 U.S.C. 154(b) by 103 days.

(21) Appl. No.: 16/778,432

(22) Filed: Jan. 31, 2020

(65) Prior Publication Data

US 2021/0240725 A1 Aug. 5, 2021

(51) Int. Cl.
*G06F 16/25* (2019.01)
*G06F 16/242* (2019.01)
*G06F 16/2452* (2019.01)
*G06F 16/22* (2019.01)

(52) U.S. Cl.
CPC ........ *G06F 16/252* (2019.01); *G06F 16/2228* (2019.01); *G06F 16/2435* (2019.01); *G06F 16/24528* (2019.01)

(58) Field of Classification Search
CPC .. G06F 16/338; G06F 16/252; G06F 16/2228; G06F 16/2435; G06F 16/24528
See application file for complete search history.

(56) References Cited

U.S. PATENT DOCUMENTS

| | | | |
|---|---|---|---|
| 9,940,394 B1 | 4/2018 | Grant et al. | |
| 10,193,775 B2 | 1/2019 | Fletcher et al. | |
| 10,965,629 B1* | 3/2021 | Bekmambetov | ........ G06T 13/80 |
| 2002/0129108 A1 | 9/2002 | Sykes | |
| 2003/0028441 A1* | 2/2003 | Barsness | ............ G06Q 30/0601 705/26.1 |
| 2005/0027702 A1* | 2/2005 | Jensen | .................. G06F 16/958 |
| 2006/0173767 A1* | 8/2006 | Hansen | .................. G06Q 40/00 705/35 |
| 2013/0218896 A1 | 8/2013 | Palay | |

(Continued)

OTHER PUBLICATIONS

U. S. Patent Application for Format-Dynamic String Processing in Group-Based Communication Systems, U.S. Appl. No. 16/659,274, dated Oct. 21, 2019.

(Continued)

*Primary Examiner* — William Spieler
(74) *Attorney, Agent, or Firm* — Holland & Hart LLP

(57) ABSTRACT

Methods, apparatuses and computer program products for improving data retrieval in a group-based communication system are described herein. The apparatus is configured to at least receive a first search query comprising a first search string, identify a first index object of a plurality of index objects based at least in part on the first search string, retrieve a first message object based at least in part on the first index object, and cause rendering of the first message object within a group-based communication user interface on a client device based at least in part on at least one element content attribute and at least one element style attribute of the first message object.

15 Claims, 15 Drawing Sheets

(56) References Cited

U.S. PATENT DOCUMENTS

| | | | |
|---|---|---|---|
| 2014/0059140 A1* | 2/2014 | Auriemma | H04L 69/08 709/206 |
| 2015/0312176 A1* | 10/2015 | Jones | H04L 65/403 709/206 |
| 2017/0142044 A1* | 5/2017 | Ball | G06Q 50/01 |
| 2018/0189735 A1* | 7/2018 | Lo | G06Q 10/08 |
| 2018/0287982 A1 | 10/2018 | Draeger et al. | |
| 2019/0200177 A1 | 6/2019 | Greene et al. | |
| 2021/0029065 A1* | 1/2021 | Erhart | H04L 51/02 |
| 2021/0029249 A1* | 1/2021 | Erhart | H04L 51/02 |
| 2021/0136011 A1* | 5/2021 | Chang | H04L 51/046 |
| 2021/0182317 A1* | 6/2021 | Gadek | H04L 51/32 |

OTHER PUBLICATIONS

"Die, Email, Die! A Flickr Cofounder Aims To Cut Us All Some Slack", Readwriteweb, Lexisnexis, www.advance.lexis.com/api/permalink/33dd79e2-90f5-409d-ae27-5a2c7e86bf31/?context=1000516. (dated Aug. 14, 2013, 4:15 PM) 2 pages.

"How Slack changed the way we work by putting the customer experience first", Repeat Customer Podcast, Episode 3, [online][retrieved May 9, 2019]. Retrieved from the Internet: www.zendesk.com/resources/slack-customer-experience/, (2019) 13 pages.

Adrienne LaFrance, "The Triumph of Email" Atlantic Online, Lexisnexis, www.advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: www.slate.com/business/2014/05/stewart-butterfield-flickr-and-slack-how-he-snatched-victory-from-the-jaws-of-defeat.html. (dated May 28, 2014, 2:48 PM) 8 pages.

Ernie Smith, "Picking Up The Slack", TEDIUM, [online][retrieved May 9, 2019], Retrieved from the Internet: www.tedium.co/2017/10/17/irc-vs-slack-chat-history/. (dated Oct. 17, 2017) 13 pages.

Internet Relay Chat, WIKIPEDIA, [online][retrieved May 30, 2019]. Retrieved from the Internet: www.wikipedia.org/wiki/Internet_Relay_Chat. (dated May 28, 2019) 20 pages.

Jonathan Vanian, "Why these startups think chat apps are the next big thing in workplace collaboration", GIGAOM, Lexisnexis, www.advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", FUJITSU Sci. Tech. J., 36, 2, (Dec. 2000) 154-161.

Matthew Ingram, "Flickr co-founder launches Slack, an all-in-one messaging tool designed to kill email forever", GIGAOM, LEXISNEXIS, www.advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", PANDODAILY, LEXISNEXIS, www.advance.lexis.com/api/permalink/dd2d4ee5-2ddf-4d3a-a1d9-3bcee5e38b74/?context=1000516, (dated Feb. 6, 2015, 2:12 AM) 3 pages.

Mike Isaac, "Slack, a Start-Up With an App to Foster Business Collaboration, Is Valued at $1.1 Billion", The New York Times Blogs (BITS), LEXISNEXIS, www.advance.lexis.com/api/permalink/3eb84b34-a8f9-4d7d-9573-89d9598a4963/?context=1000516. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: www.rfc-editor.org/rfc/rfc1459.txt. (dated May 1993) 57 pages.

Rebecca Walberg, "Email biggest office waste of time: survey", National Post, At FP10, LEXISNEXIS, www.advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", FORBES, [online][retrieved May 9, 2019]. Retrieved from the Internet: www.forbes.com/sites/roberthof/2015/06/02/stewart-butterfield-on-how-slack-became-a-2-8-billion-unicorn-2/#7c31937d7d9c. (dated Jun. 2, 2015, 3;25 PM), 3 pages.

The Big Pivot w/ Slack's Stewart Butterfield, Masters of Scale Podcast, Episode 13 (Aired Nov. 14, 2017), www.mastersofscale.com/#/stewart-butterfield-the-big-pivot/, (dated Jan. 17, 2018) 27 pages.

* cited by examiner

METHODS, APPARATUSES AND COMPUTER PROGRAM PRODUCTS FOR DATA RETRIEVAL IN A GROUP-BASED COMMUNICATION SYSTEM

BACKGROUND

Applicant has identified many deficiencies and problems associated with data retrieval in computer systems. For example, many methods, apparatus, and systems fail to provide data retrieval functionalities for text data having associated formatting data.

BRIEF SUMMARY

In general, embodiments of the present disclosure provide methods, apparatus, systems, computing devices, and/or the like for improving data retrieval in a group-based communication system.

In accordance with various embodiments of the present disclosure, an apparatus for improving data retrieval in a group-based communication platform may be provided. The apparatus may comprise at least one processor and at least one non-transitory memory comprising a computer program code. The at least one non-transitory memory and the computer program code may be configured to, with the at least one processor, cause the apparatus to: receive a first search query comprising a first search string from a client device; identify a first index object of a plurality of index objects based at least in part on the first search string; retrieve a first message object based at least in part on the first index object; and cause rendering of the first message object within a group-based communication user interface on the client device. In some examples, the first message object may comprise at least one element content attribute and at least one element style attribute. In some examples, causing rendering of the first message object may be based at least in part on the at least one element content attribute and the at least one element style attribute.

In some examples, the at least one non-transitory memory and the computer program code are configured to, with the at least one processor, cause the apparatus to further parse the first search query to obtain the first search string.

In some examples, the first index object may comprise one or more index strings. In some examples, the at least one non-transitory memory and the computer program code may be configured to, with the at least one processor, cause the apparatus to further identify a first index string from the one or more index strings based at least in part on the first search string.

In some examples, the first search string may be a text search string. In some examples, the first index string may comprise a first index string portion corresponding to the text search string. In some examples, the at least one non-transitory memory and the computer program code may be configured to, with the at least one processor, cause the apparatus to further: in response to determining that the first index string portion may be at least one of: preceded by a first whitespace indicator or followed by a second whitespace indicator, identify the first index object as corresponding to the first search string.

In some examples, the first search string may be a user identifier search string. In some examples, the first index string may comprise a first index string portion corresponding to the user identifier search string. In some examples, the at least one non-transitory memory and the computer program code may be configured to, with the at least one processor, cause the apparatus to further: in response to determining that the first index string portion may be preceded by a first user identifier indicator, identify the first index object as corresponding to the first search string.

In some examples, the first search string may be a channel identifier search string. In some examples, the first index string may comprise a first index string portion corresponding to the channel identifier search string. In some examples, the at least one non-transitory memory and the computer program code may be configured to, with the at least one processor, cause the apparatus to further: in response to determining that the first index string portion may be preceded by a first channel identifier indicator, identify the first index object as corresponding to the first search string.

In some examples, when causing rendering of the first message object within the group-based communication user interface, the at least one non-transitory memory and the computer program code may be configured to, with the at least one processor, cause the apparatus to further: identify a first element content attribute of the first message object based at least in part on the first search string; and generate a first element style attribute in the first message object, wherein the first element style attribute indicates highlight visualization effects for the first element content attribute.

In some examples, the first element content attribute may comprise a first element content attribute portion and a second element content attribute portion. In some examples, the first element content attribute portion may correspond to the first search string. In some examples, the at least one non-transitory memory and the computer program code may be configured to, with the at least one processor, cause the apparatus to further: generate a second element content attribute based at least in part on the second element content attribute portion of the first element content attribute; remove the second element content attribute portion from the first element content attribute; and cause rendering of the first message object based at least in part on the first element content attribute and the second element content attribute.

In some examples, when identifying the first element content attribute, the at least one non-transitory memory and the computer program code are configured to, with the at least one processor, cause the apparatus to further: identify a second element content attribute that precedes the first element content attribute in the first message object; and in response to determining that the second element content attribute comprises an end whitespace indicator, cause rendering of the first message object based at least in part on the first element content attribute and the second element content attribute.

In some examples, the at least one non-transitory memory and the computer program code are configured to, with the at least one processor, cause the apparatus to further: generate a second index object corresponding to a second message object; retrieve the second message object based at least in part on the second index object corresponding to a second search string; and cause rendering of the second message object within the group-based communication user interface. In some examples, the second message object may comprise a first element object and a second element object. In some examples, the first element object may comprise a first element content attribute and a first element style attribute. In some examples, the second element object may comprise a second element content attribute and a second element style attribute. In some examples, generate the second index object is based at least in part on the first element content attribute and the second element content attribute.

In some examples, the at least one non-transitory memory and the computer program code are configured to, with the at least one processor, cause the apparatus to further: receive, from the client device, an input string comprising a first word portion and a second word portion; generate, based on the input string, a second message object comprising a first element object and a second element object; and cause rendering of the second message object within the group-based communication user interface based at least in part on the first element style attribute. In some examples, the first word portion may be associated with a structured format trigger. In some examples, the first element object may comprise a first element content attribute corresponding to the first word portion and a first element style attribute based at least in part on the structured format trigger. In some examples, the second element object may comprise a second element content attribute corresponding to the second word portion.

In some examples, the at least one non-transitory memory and the computer program code may be configured to, with the at least one processor, cause the apparatus to further: retrieve an input string associated with a markup-based structured format, wherein the input string comprises at least one text portion and at least one formatting symbol portion; identify a structured format for the at least one text portion based on the at least one formatting symbol portion; generate, based on the input string, a second message object comprising a first element object, wherein the first element object comprises a first element content attribute and a first element style attribute, wherein the first element content attribute corresponds to the at least one text portion, wherein the first element style attribute is based at least in part on the structured format; and cause rendering of the second message object within the group-based communication user interface based at least in part on the first element style attribute.

In some examples, the at least one non-transitory memory and the computer program code may be configured to, with the at least one processor, cause the apparatus to further: retrieve an input string associated with a serialization-based structured format, wherein the input string comprises at least one text portion and at least one feature-definition instruction; identify a structured format for the at least one text portion based on the at least one feature-definition instruction; generate, based on the input string, a second message object comprising a first element object, wherein the first element object comprises a first element content attribute and a first element style attribute, wherein the first element content attribute corresponds to the at least one text portion, wherein the first element style attribute is based at least in part on the structured format; and cause rendering of the second message object within the group-based communication user interface based at least in part on the first element style attribute.

In accordance with various embodiments of the present disclosure, a computer-implemented method for improving data retrieval in a group-based communication platform is provided. The computer-implemented method may comprise receiving, from a client device, a first search query comprising a first search string; identify a first index object of a plurality of index objects based at least in part on the first search string; retrieving a first message object based at least in part on the first index object, wherein the first message object comprises at least one element content attribute and at least one element style attribute; and causing rendering of the first message object within a group-based communication user interface on the client device based at least in part on the at least one element content attribute and the at least one element style attribute.

In accordance with various embodiments of the present disclosure, a computer program product may be provided. The computer program product may comprise at least one non-transitory computer-readable storage medium having computer-readable program code portions stored therein. The computer-readable program code portions may comprise an executable portion configured to: receive, from a client device, a first search query comprising a first search string; identify a first index object of a plurality of index objects based at least in part on the first search string; retrieve a first message object based at least in part on the first index object, wherein the first message object comprises at least one element content attribute and at least one element style attribute; and cause rendering of the first message object within a group-based communication user interface on the client device based at least in part on the at least one element content attribute and the at least one element style attribute.

The above summary is provided merely for the purpose of summarizing some example embodiments to provide a basic understanding of some aspects of the disclosure. Accordingly, it will be appreciated that the above-described embodiments are merely examples and should not be construed to narrow the scope or spirit of the disclosure. It will be appreciated that the scope of the disclosure encompasses many potential embodiments in addition to those here summarized, some of which will be further described below.

BRIEF DESCRIPTION OF THE DRAWINGS

Figure 1:
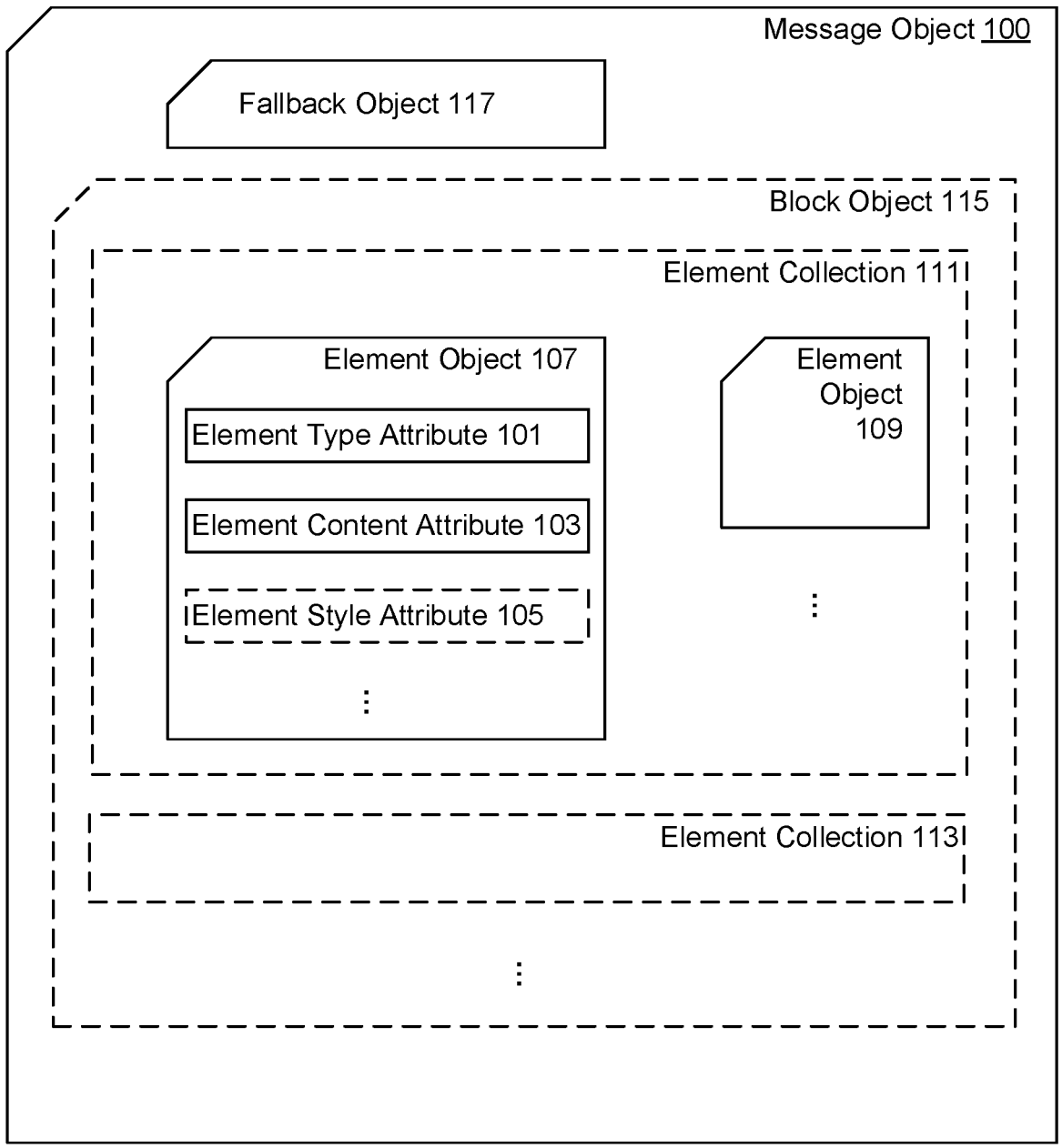
Figure 2:
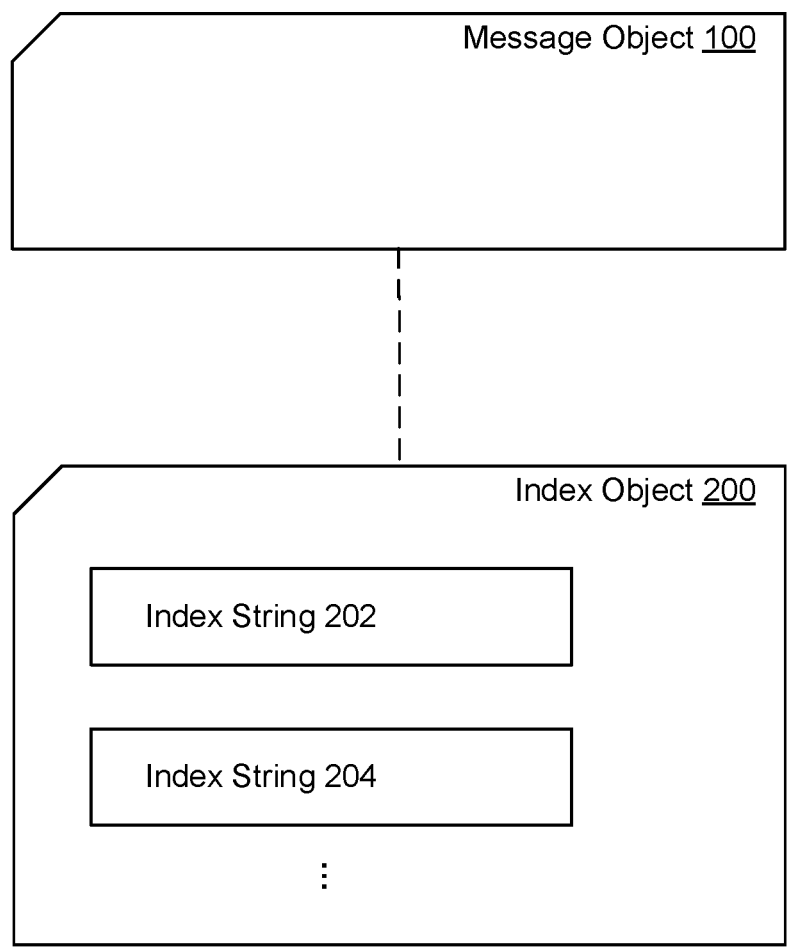
Figure 3:
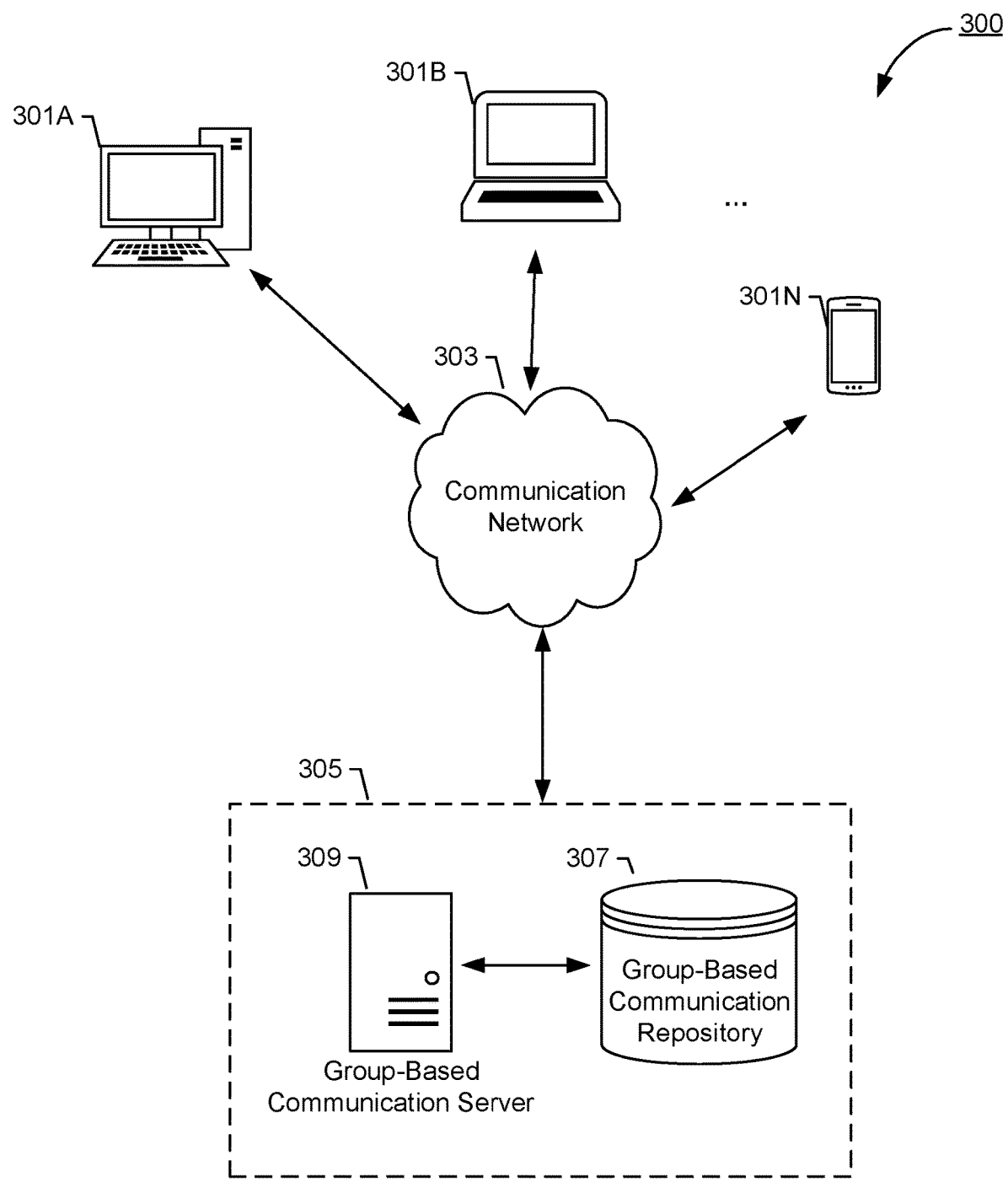
Figure 4:
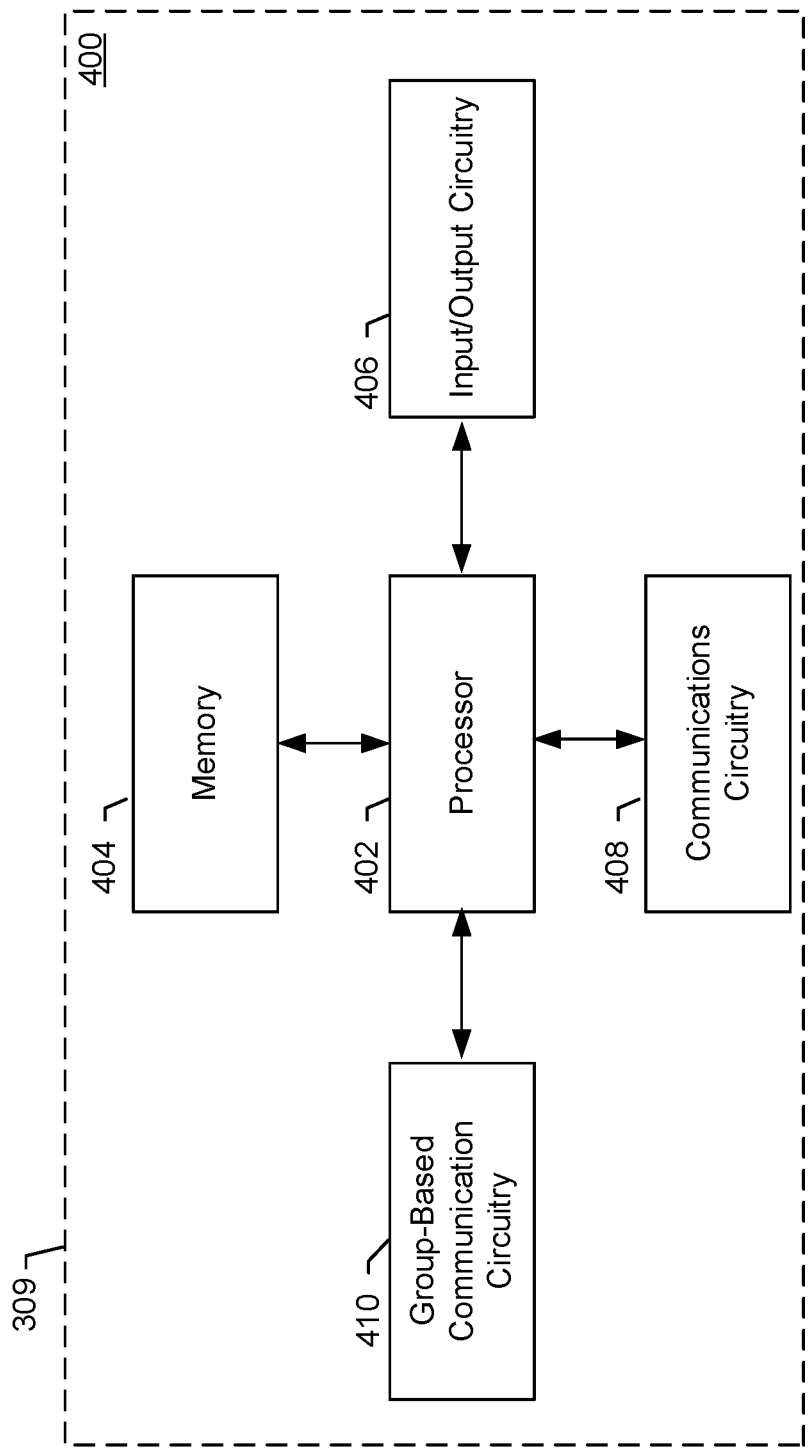
Figure 5:
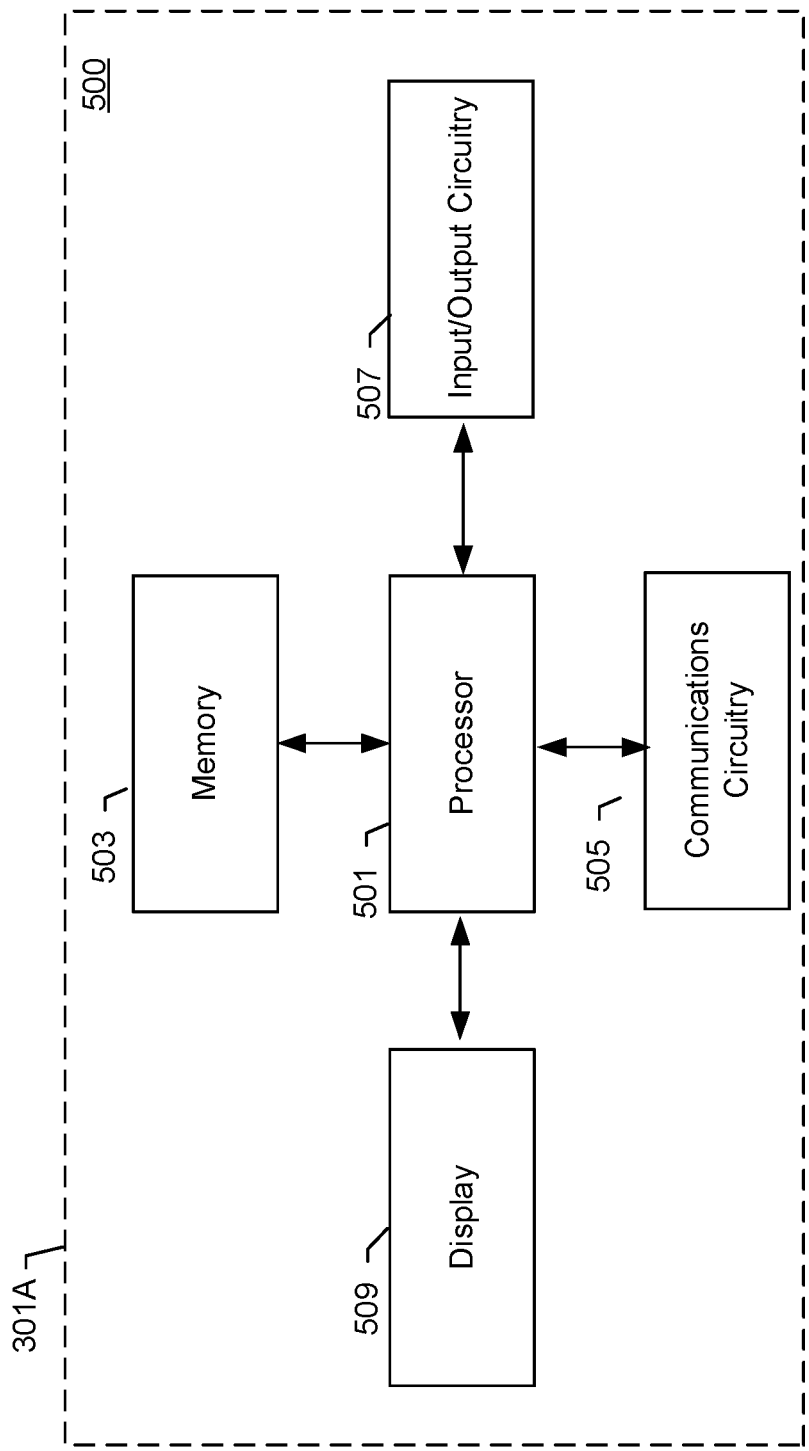
Figure 6:
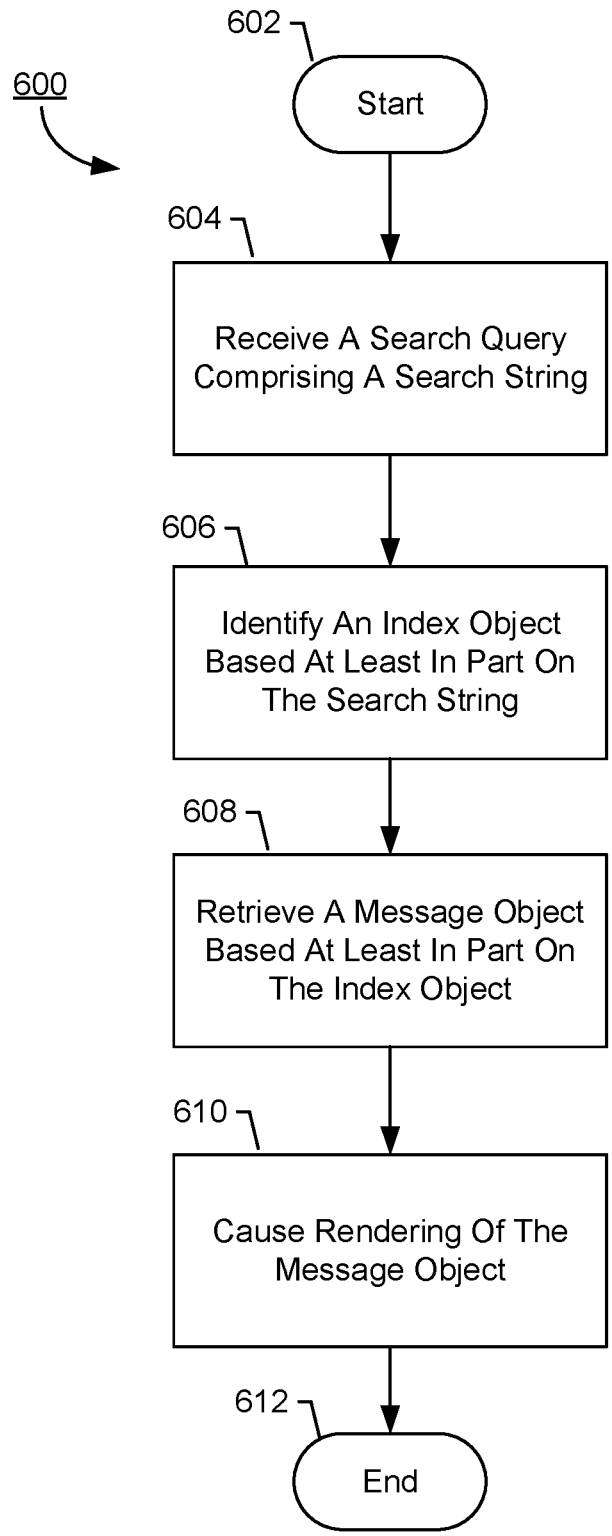
Figure 7:
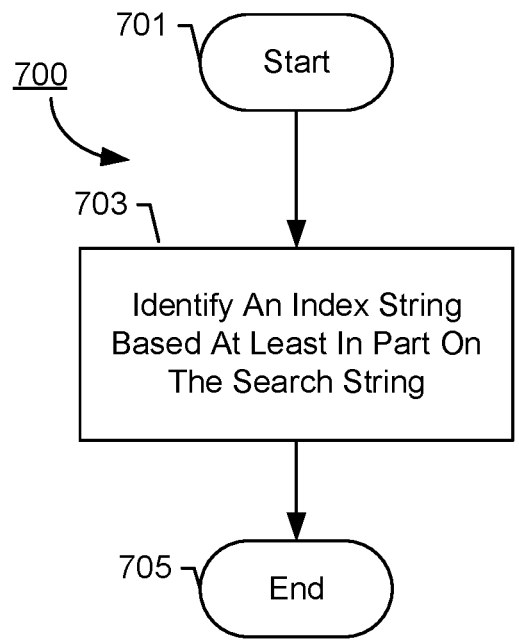
Figure 8:
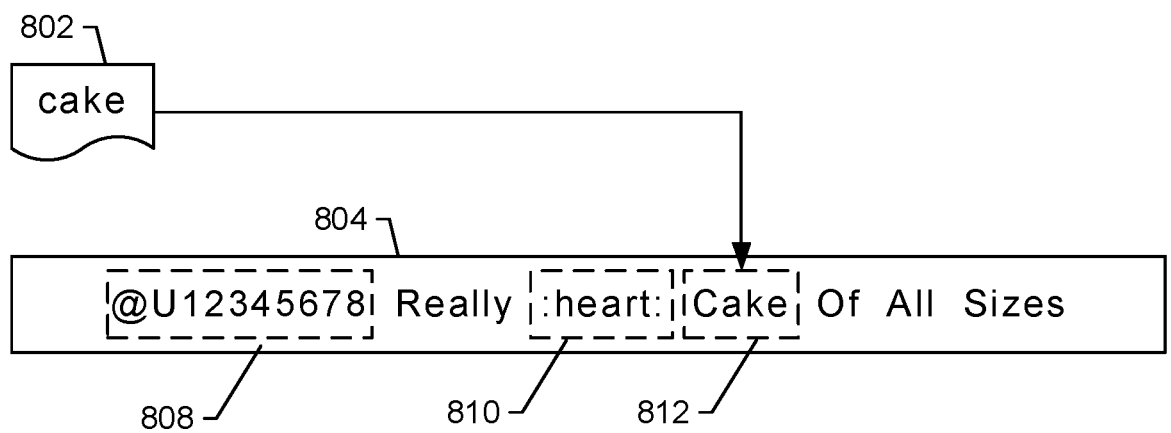
Figure 9:
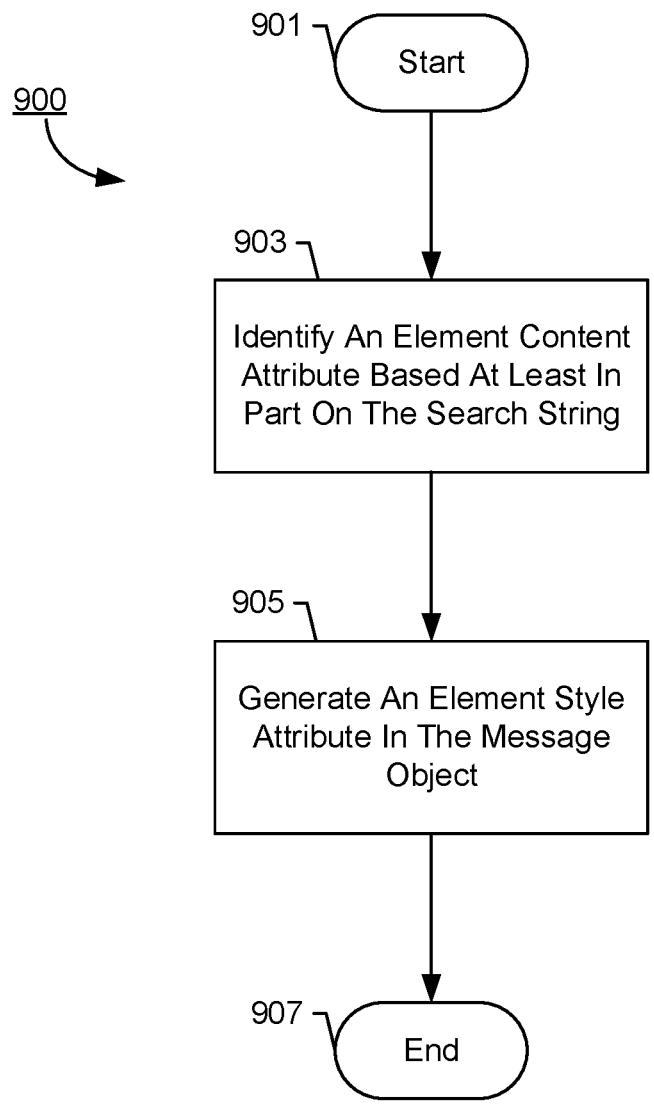
Figure 10A:
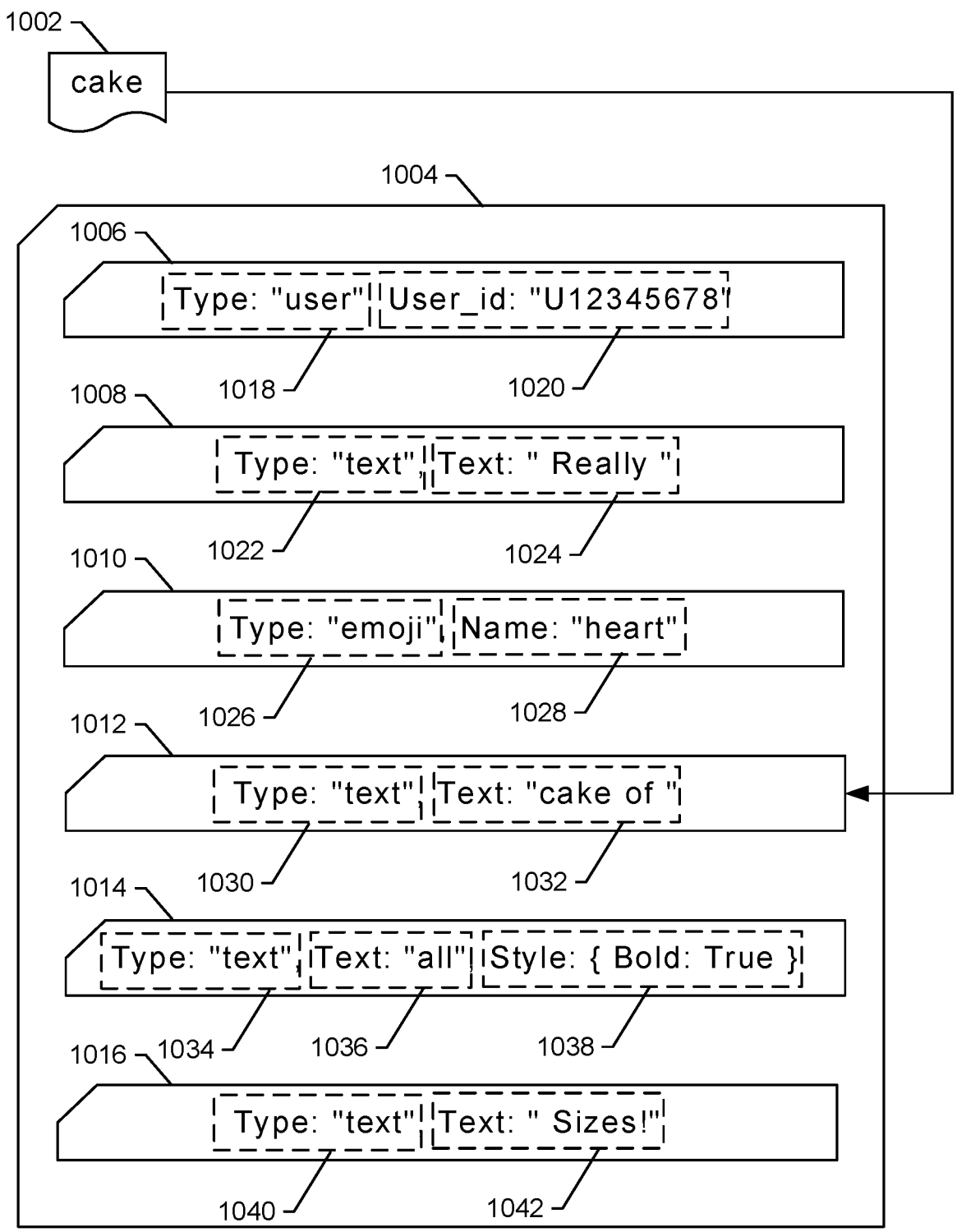
Figure 10B:
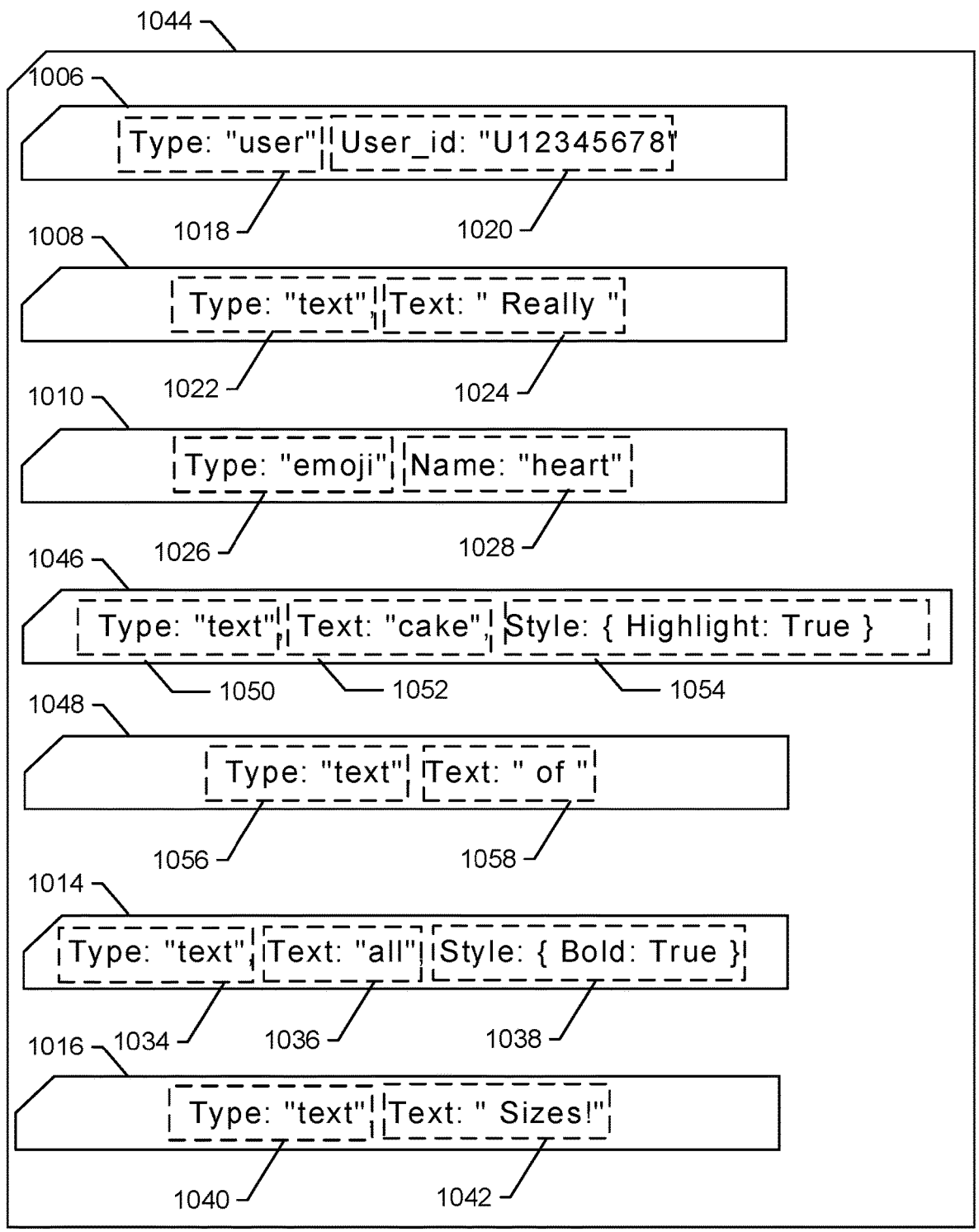
Figure 11:
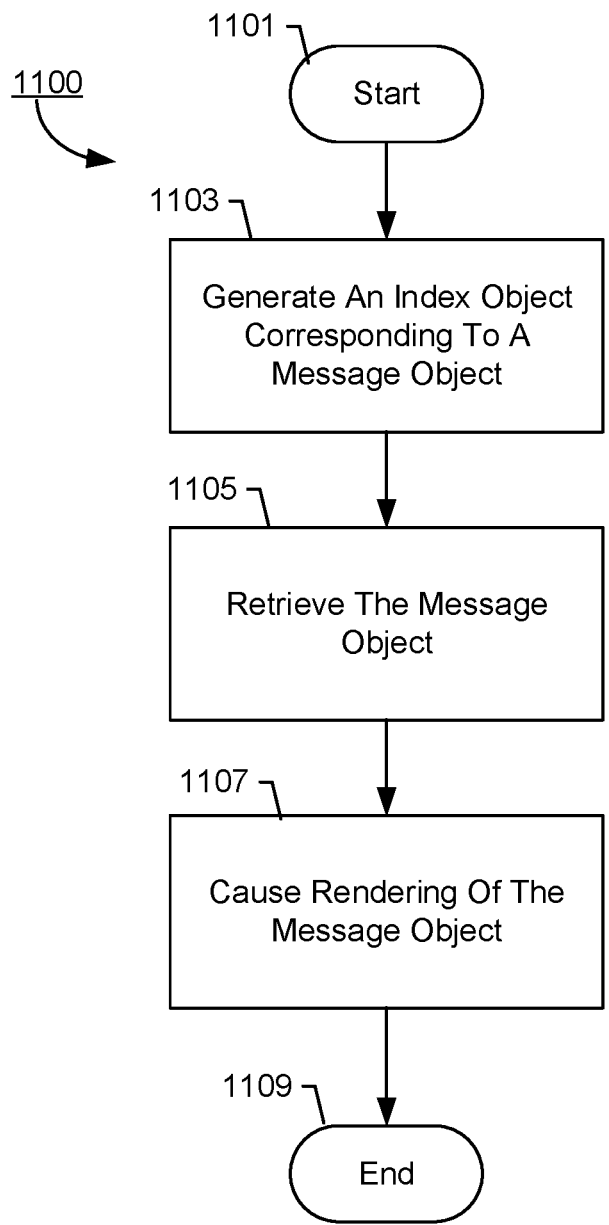
Figure 12:
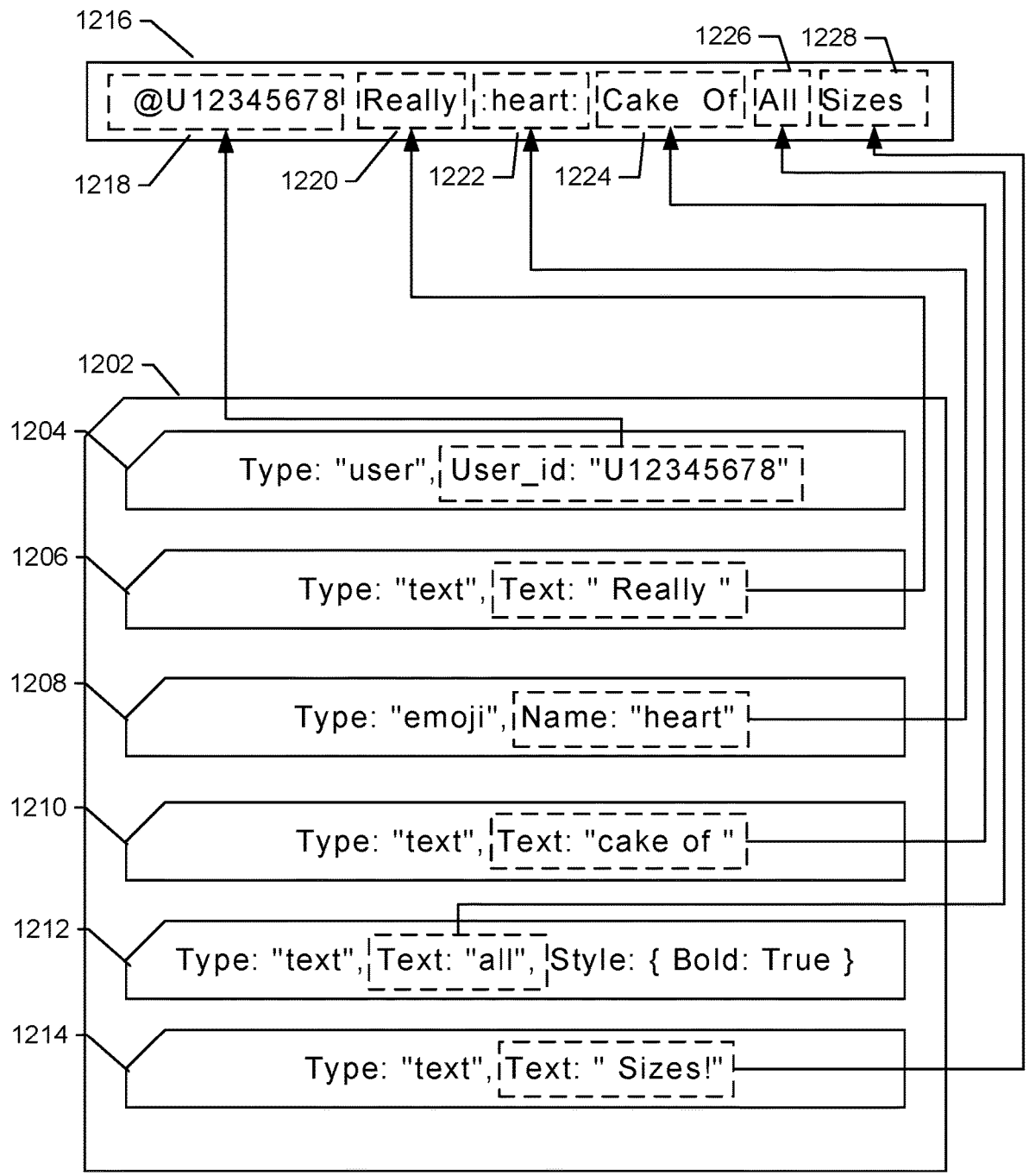
Figure 13:
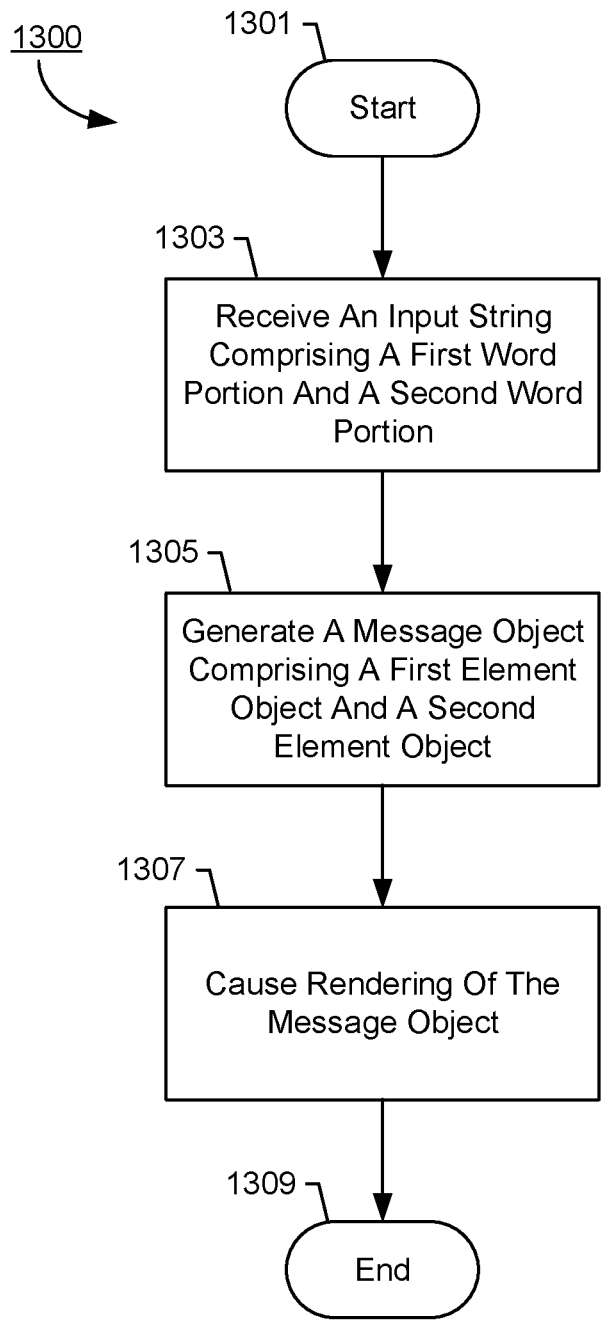
Figure 14:
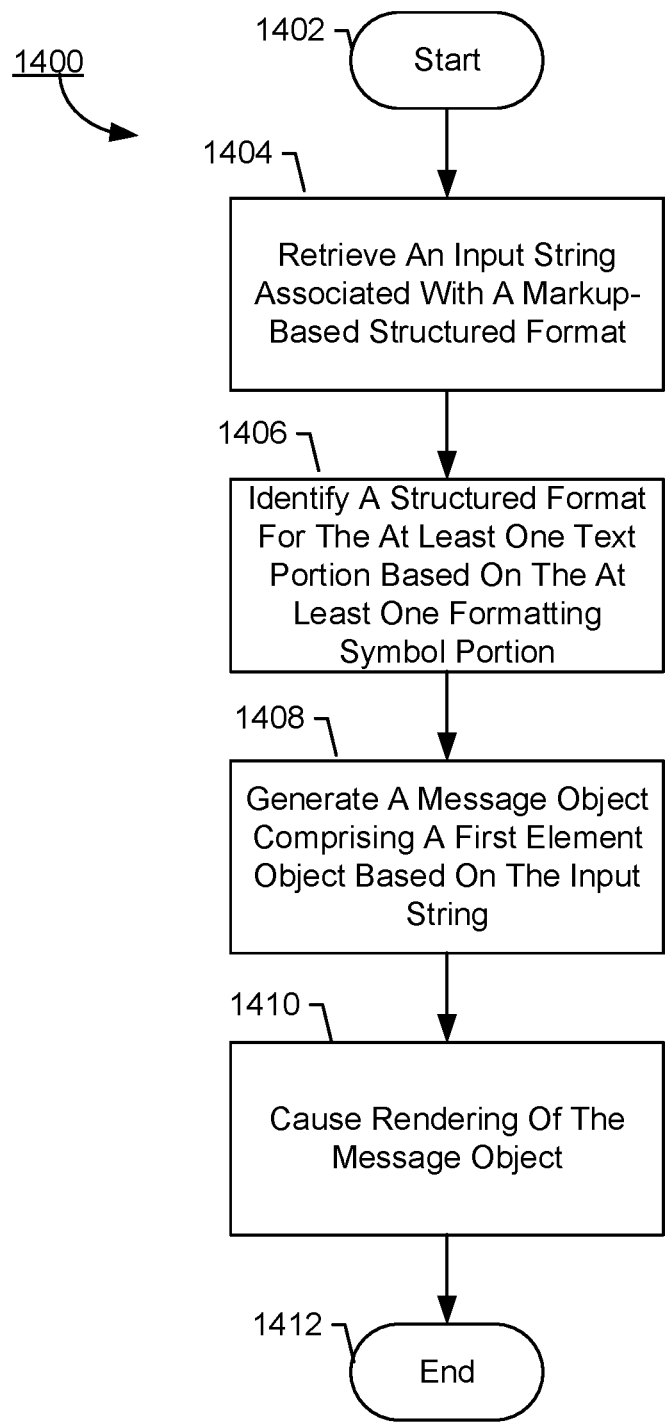
Figure 15:
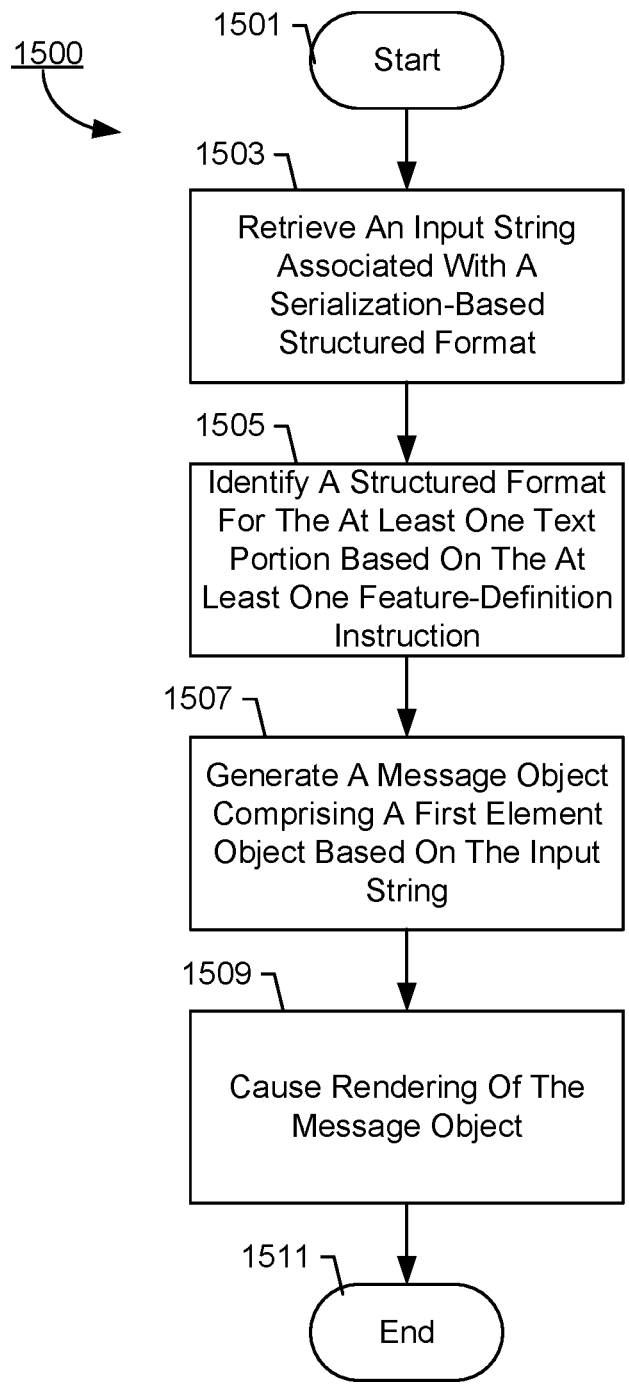

Having thus described some embodiments in general terms, references will now be made to the accompanying drawings, which are not necessarily drawn to scale, and wherein:

FIG. 1 is an example diagram illustrating example data objects in accordance with some embodiments of the present disclosure;

FIG. 2 is an example diagram illustrating example data objects in accordance with some embodiments of the present disclosure;

FIG. 3 is an example system architecture diagram illustrating an example group-based communication system in communication with other devices in accordance with some embodiments of the present disclosure;

FIG. 4 is an example infrastructure diagram illustrating an example apparatus in accordance with some embodiments of the present disclosure;

FIG. 5 is an example infrastructure diagram illustrating an example apparatus in accordance with some embodiments of the present disclosure;

FIG. 6 is an example flowchart illustrating an example method in accordance with some embodiments of the present disclosure;

FIG. 7 is an example flowchart illustrating an example method in accordance with some embodiments of the present disclosure;

FIG. 8 is an example diagram illustrating an example process in accordance with some embodiments of the present disclosure;

FIG. 9 is an example flowchart illustrating an example method in accordance with some embodiments of the present disclosure;

FIG. 10A is an example diagram illustrating an example process in accordance with some embodiments of the present disclosure;

FIG. 10B is an example diagram illustrating an example process in accordance with some embodiments of the present disclosure;

FIG. 11 is an example flowchart illustrating an example method in accordance with some embodiments of the present disclosure;

FIG. 12 is an example diagram illustrating an example process in accordance with some embodiments of the present disclosure;

FIG. 13 is an example flowchart illustrating an example method in accordance with some embodiments of the present disclosure;

FIG. 14 is an example flowchart illustrating an example method in accordance with some embodiments of the present disclosure; and FIG. 15 is an example flowchart illustrating an example method in accordance with some embodiments of the present disclosure.

DETAILED DESCRIPTION OF VARIOUS EMBODIMENTS

Various embodiments of the present disclosure are described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as "comprises," "includes," and "having" should be understood to provide support for narrower terms such as "consisting of," "consisting essentially of," and "comprised substantially of."

The phrases "in one embodiment," "according to one embodiment," "in some examples," "for example," and the like generally mean that the particular feature, structure, or characteristic following the phrase may be included in an embodiment of the present disclosure, and may be included in more than one embodiment of the present disclosure (importantly, such phrases do not necessarily refer to the same embodiment).

Overview

Various embodiments of the present disclosure relate generally to data retrieval in network systems. More specifically, various embodiments of the present disclosure are related to identifying and rendering a message object in response to a search query in a group-based communication system.

Challenges exist in data retrieval in messaging platforms. For example, messages in these platforms may be formatted with visualization effects (for example, bolding, italics, strikethrough). When storing these messages, some platforms fail to capture and preserve the formatting data associated with these messages, resulting in data and formatting loss when these messages are rendered for display.

Some platforms use markup language (such as markdown) to describe formatting data associated with messages. However, when a markdown format character (for example, the asterisk symbol "*") is inserted within the message, many platforms fail to distinguish the markdown format character from the body of the message. When a user transmits a search query to these platforms to retrieve a message, these platforms may not be able to identify all messages that matches the search query. As an example, the following markdown code describes a message "supernatural" where the characters "super" have bold visualization effects:

\*super\*natural

When a user transmits a search query to locate messages containing the word "supernatural," these platforms may not be able to identify the above message as a match to the search query because of the asterisk symbol.

Further, when conducting search operations, many platforms reply on parsing the messages together with formatting data, causing significant latency in generating search results. Many platforms render search results in chunks of texts, providing a suboptimal user interface experience as users are required to read through these chucks of texts to locate the term(s) provided in the search query.

In contrast, systems structured in accordance with various embodiments of the disclosure provide specific, technical solutions to these technical problems. For example, various embodiments of the disclosure may generate a data structure ("message object") that captures and preserves formatting information associated with messages. Various embodiments of the disclosure may generate a data structure ("index object") to facilitate indexing and searching of messages. Various embodiments of the disclosure may cause rendering of a user interface that includes highlights on the search terms in the search results, thus providing an optimal user interface experience. As a result, various embodiments of the present disclosure may reduce latency in data retrieval, improve search result accuracy, and reduce network resource usage, details of which are described hereinafter.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

In the present disclosure, the term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

"Group-based" is used herein to refer to a system, channel, message, or virtual environment that has security sufficient such that the system, channel, message, or virtual environment is accessible to a defined group of users (e.g., users having a common group identifier associated with their respective user profiles). The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The term "group-based communication system" refers to a communications software platform and associated hardware that is configured to support and maintain a plurality of group-based communication user interfaces and all associated functionality. Group-based communication system users are organized into organization groups (e.g., employees of different companies may be separate organization groups) and each group interacts with the platform via a respective group-based communication user interface. Example group-based communication systems comprise supporting servers and client devices, as defined below.

The term "group-based communication server" refers to a software platform and associated hardware that is configured to manage access to the various group-based communication user interfaces of the group-based communication system and provide various functionalities as described below. The group-based communication server is configured to access, maintain, and support application product logic of the group-based communication system and to access one or more data repositories such as a group-based communication repository and a user identification repository.

The term "user" should be understood to refer to an individual, group of individuals, business, organization, and the like. Users referred to herein are discussed largely in connection with client device enabled activity for accessing a group-based communication user interface (or set of group-based communication user interfaces) of a group-based communication system.

The terms "user profile," "user account," and "user account details" refer to data, files, and other information associated with a user, including, for example, a user identifier, one or more group-based communication channel identifiers (defined below) associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, a graphical representation, an email address, a real name (e.g., John Doe), a username (e.g., jdoe), a password, a time zone, an external resource user identifier, avatar rendering settings, and the like. The user account details can include a subset designation of user credentials, such as, for example, login information for the user including the user's username and password.

In the present disclosure, the term "user identifier" refers to an identifier that uniquely identifies information stored in a group-based communication system that is related to a user. Information related to a user may be stored in a "user profile," "user account," or "user account details," which may include one or more group-based communication channel identifiers associated with group-based communication channels that the user has been granted access privileges to, one or more group identifiers for groups that the user has been granted access privileges to, an indication as to whether the user is an owner of any group-based communication channels, an indication as to whether the user has any group-based communication channel restrictions, a plurality of messages, a plurality of emoji, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

In the present disclosure, the term "user group identifier" refers to an identifier that uniquely identifies information stored in a group-based communication system that is related to a group of users.

In the present disclosure, the term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

Group-based communication system users are organized into organization groups (e.g., employees of each company may be a separate organization group) and each organization group may have one or more group-based communication channels to which users may be assigned or which the users may join (e.g., group-based communication channels may represent departments, geographic locations such as offices, product lines, user interests, topics, issues, and/or the like). A group identifier is used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The terms "group-based communication channel identifier" or "channel identifier" refer to one or more items of data by which a group-based communication channel may be uniquely identified by a group-based communication system. For example, a group-based communication channel identifier may comprise American Standard Code for Information Interchange (ASCII) text, a pointer, a memory address, and the like.

The terms "group identifier" or "team identifier" refer to one or more items of data by which a group within a group-based communication system may be uniquely identified. For example, a group identifier may comprise ASCII text, a pointer, a memory address, and the like. For example, the group identifier associated with member users of a Slack Corporation workspace (i.e., a group-based communication user interface) may be 104356721.

The term "group-based communication user interface" refers to a virtual communications environment configured to facilitate user interaction with a group-based communications system. Each group-based communication user interface is accessible and viewable to a select group of users, such as a group of employees of a business or organization. For example, a group-based communication user interface for Corporation A may be accessible and viewable to employees of Corporation A; however, a group-based communication user interface for Corporation B would not be accessible and viewable to employees of Corporation A. In some examples, the group-based communication user interface comprises a plurality of group-based communication channels (e.g., a marketing channel, sales channel, accounting channel, etc.), which are defined below.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "group-based communication channel data" refers to data items associated with communications between, and files shared by, channel members of a group-based communication channel.

In the present disclosure, the terms "messaging communication," "electronic message," or "message" refer to electronic content generated by a user using a client device and transmitted to a group-based communication server. Messaging communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication. Each messaging communication sent or posted to (i.e., transmitted for rendering within an interface of) a group-based communication server may include metadata comprising the following: a sending user identifier, a message identifier, message contents, a group identifier, and a group-based communication channel identifier. Each of the foregoing identifiers may comprise ASCII text, a pointer, a memory address, and the like.

In some examples, a messaging communication may comprise one or more "input strings" generated by a user using a client device. The term "input string" may refer to one or more texts or characters for a messaging communication composed by a client device within a group-based communication user interface. In some examples, an input string may include encodings of a set of characters as well as formatting data associated with the set of characters. In some examples, the encoded data associated with an input string may include content data associated with a message communication and formatting data associated with the message communication. Content data associated with the messaging communication may include data encoded using one or more text encoding protocols, such as using an ASCII text encoding protocol or a Unicode text encoding protocol. Formatting data associated with an input string may include data encoded based on one or more structured formats, such as a markup-based structured format or a serialization-based structured format as described herein.

The term "markup-based structured format" refers to a structured format that enables defining input string features by integrating formatting symbols within input strings. For example, a particular markup-based structured format may be characterized by a functionality that enables marking a particular input string data portion as italicized by putting particular alphanumeric character patterns immediately before and after the particular input string data portion. Additional details of "markup-based structured format" are described in U.S. patent application Ser. No. 16/659,274, filed on Oct. 21, 2019, the entire content of which is incorporated by reference.

The term "serialization-based structured format" refers to a structured format that enables defining input string features by supplying feature-definition instructions within feature definition files associated with the input string. For example, a particular serialization-based structured format may enable defining visualization features of input string data portions through generating feature arrays associated with input string data portions (e.g., a feature array in which one feature value represents whether the corresponding input string data portion should be italicized, another feature value represents whether the corresponding input string data portion should be bolded, another feature value represents a desired size of the input string data portion, etc.). An example of a serialization-based structured format is Rich Text Format (RTF). Additional details of "serialization-based structured format" are described in U.S. patent application Ser. No. 16/659,274, filed on Oct. 21, 2019, the entire content of which is incorporated by reference.

In some examples, an input string may comprise one or more "structured format trigger," which may indicate the formatting data of the input string described above. For example, at least a subset of the characters of the input string may correspond to special characters (e.g., the symbols "*" for bold text, "_" for italics, "~" for strikethrough, etc.) associated with code for adding formatting (e.g., bold, italics, strikethroughs, etc.) to corresponding characters of the input string. In such an example, the special characters may serve as structured format trigger.

In the present disclosure, the term "data object" refers to a data structure that represents one or more functionalities and/or characteristics associated with data and/or information. For example, a "message object" is a data object that may represent a messaging communication in a group-based communication system. In some examples, a message object may be generated by a group-based communication server for storing data and information associated with a messaging communication and for rendering the messaging communication for display within a group-based communication user interface. Referring now to FIG. 1, an example message object 100 is shown.

In the example shown in FIG. 1, the example message object 100 may comprise a fallback object 117 and one or more element objects (such as an element object 107 and an element object 109).

The term "fallback object" refers to a data object that may represent at least a portion of a messaging communication in a plain text format. As used herein, the term "plain text format" refers to a data format that may only define text(s) or character(s) associated with the data and do not define presentation-related features of the text(s) or character(s) when they are rendered for display. For example, when a text string in a plain text format is rendered for display, the text string may only be rendered to display characters in the text string and without any visualization effects (for example, no bolding visualization effects, no italicization visualization effects, no strikethrough visualization effects, no code text visualization effects, no highlight visualization effects, no underlining visualization effects, no color modification visualization effects, no size enhancement visualization effects, etc.).

Referring back to FIG. 1, the fallback object 117 may include text(s) or character(s) associated with an input string of a messaging communication, and may exclude any formatting data associated with the input string. For example, when the fallback object 117 is rendered for display in a group-based communication user interface, the group-based communication user interface may display text(s) or character(s) associated with a messaging communication based on the corresponding input string, but may not display these text(s) or character(s) in any visualization effects (for example, no bolding visualization effects, no italicization visualization effects, no strikethrough visualization effects, no code text visualization effects, no highlight visualization effects, no underlining visualization effects, no color modification visualization effects, no size enhancement visualization effects, etc.) that may be provided for the input string in the messaging communication.

In various examples of the present disclosure, the fallback object 117 may be represented or described in computer programming codes. For example, the following is an example programming code describing an example fallback object, substantially in the form of JavaScript Object Notation (JSON) data interchange format:

```
{ // Message object
    text: "Hello world!", // Fallback Object
}
```

While the above example describes an example fallback object in JSON format, it is noted that the scope of the present disclosure is not limited to JSON format only. In some examples, other data interchange format and/or programming language may be used to represent or describe a fallback object.

The term "element object" refers to a data object that may represent at least a portion of a messaging communication in a structured format. As used herein, the term "structured format" refers to a data format that may not only define text(s) or character(s) associated with the data, but also provide feature encoding protocols for defining various features associated with the data. In some examples, a structured format may define protocols for defining and encoding presentation-related features, such as visualization effects (for example, bolding visualization effects, italicization visualization effects, strikethrough visualization effects, code text visualization effects, highlight visualization effects, underlining visualization effects, color modification visualization effects, size enhancement visualization effects, etc.).

Referring back to FIG. 1, the element object 107 may include text(s) or character(s) associated with an input string of a messaging communication, and may also include any formatting data associated with the input string. For example, when the element object 107 is rendered for display in a group-based communication user interface, the group-based communication user interface may not only display text(s) or character(s) associated with a messaging communication based on the corresponding input string, but also display these text(s) or character(s) in any visualization effects (for example, bolding visualization effects, italicization visualization effects, strikethrough visualization effects, code text visualization effects, highlight visualization effects, underlining visualization effects, color modification visualization effects, size enhancement visualization effects, etc.) that may be provided for the input string in the messaging communication.

In the example shown in FIG. 1, the element object 107 may comprise an element type attribute 101, an element content attribute 103, and/or an element style attribute 105. As used herein, the term "attribute" refers to a parameter that may define one or more characteristics of a data object.

In some examples, the element type attribute 101 may define a type of the element object 107. For example, when the element type attribute is "text," it may indicate that the corresponding element object is a text element associated with the messaging communication. When the element type attribute is "user," it may indicate that the corresponding element object is a user mention element associated with the messaging communication (i.e. a user identifier associated with a user mentioned in the messaging communication). When the element type attribute is "channel," it may indicate that the corresponding element object is a channel mention element associated with the messaging communication (i.e. a channel identifier associated with a channel mentioned in the messaging communication).

Additionally, or alternatively, example element type attributes in accordance with examples of the present disclosure may indicate types other than "text," "user," and "channel." For example, when the element type attribute is "user group," it may indicate that the corresponding element object is a user group mention element associated with the messaging communication (i.e. a user group identifier associated with a user group mentioned in the messaging communication). As another example, when the element type attribute is "broadcast," it may indicate that the corresponding element object is a broadcast keyword mention element associated with the messaging communication (i.e. a broadcast notification mentioned in the messaging communication). As another example, when the element type attribute is "date," it may indicate that the corresponding element object is a date element associated with the messaging communication (i.e. a date mentioned in the messaging communication). As another example, when the element type attribute is "color," it may indicate that the corresponding element object is a hex color element associated with the messaging communication (i.e. a hex color code mentioned in the messaging communication). As another example, when the element type attribute is "emoji," it may indicate that the corresponding element object is an emoji element associated with the messaging communication (i.e. an emoji mentioned in the messaging communication). As another example, when the element type attribute is "link," it may indicate that the corresponding element object is a link element associated with the messaging communication (i.e. a Uniform Resource Locator (URL) mentioned in the messaging communication).

Referring back to FIG. 1, the element content attribute 103 may define content of the element object 107. For example, when the element object is a text element, the corresponding element content attribute may provide the content of the text associated with the messaging communication. When the element object is a user mention element, the corresponding element content attribute may provide the corresponding user identifier mentioned in the messaging communication. When the element object is a channel mention element, the corresponding element content attribute may provide the corresponding channel identifier mentioned in the messaging communication.

Additionally, or alternatively, when the element object is a user group mention element, the corresponding element content attribute may provide the corresponding user group identifier. When the element object is a broadcast keyword mention element, the corresponding element content attribute may define the corresponding users who may receive the broadcast notification. When the element object is a date element, the corresponding element content attribute may provide the date mentioned in the messaging communication. When the element object is a hex color element, the corresponding element content attribute may provide the corresponding hex color code. When the element object is an emoji element, the corresponding element content attribute may provide the corresponding canonical emoji name. When the element object is a link element, the corresponding element content attribute may provide the corresponding URL.

In some examples, an element content attribute may comprise one or more indicators. For example, an element content attribute may comprise a whitespace indicator, which may indicate a whitespace character in the text(s) or character(s) of the element content attribute. As another example, an element content attribute may comprise a channel identifier indicator, which may indicate a channel identifier in the text(s) or character(s) of the element content attribute. As another example, an element content attribute may comprise a user identifier indicator, which may indicate a user identifier in the text(s) or character(s) of the element content attribute.

Referring back to FIG. 1, the element style attribute 105 may define visualization effects associated with the element object 107. In some examples, when the element object 107 is rendered for display in a group-based communication user interface, the content of the element object 107 (as defined by the element content attribute 103) may be rendered with the visualization effects as defined in the element style attribute 105.

For example, when the element style attribute is "bold," it may indicate that the content of the element object (as provided in the element content attribute) should be rendered with bolding visualization effects. When the element style attribute is "italic," it may indicate that the content of the element object should be rendered with italicization visualization effects. When the element style attribute is "strike," it may indicate that the content of the element object should be rendered with strikethrough visualization effects. When the element style attribute is "code," it may indicate that the content of the element object should be rendered with code text visualization effects. When the element style attribute is "highlight," it may indicate that the content of the element object should be rendered with highlight visualization effects.

While the example shown in FIG. 1 illustrates that an example element object may comprise an element type attribute, an element content attribute, and an element style attribute, it is noted that the scope of the present disclosure is not limited to these attributes. In some examples, an example element object may comprise less or more attributes. For example, an example element object may not comprise element style attribute, which may indicate that the corresponding content in the element content attribute is to be rendered in plain text format.

In various examples of the present disclosure, the element object 107 may be represented or described in computer programming codes. For example, the following is an example programming code describing an example element object, substantially in the form of JSON data interchange format:

```
{
    {type: "text", text: "Hello", style: {bold: true}},
}
```

In the above example, the element object is a text element representing a text string comprising the text "Hello" to be rendered in bolding visualization effects.

While the above example describes an example element object in JSON format, it is noted that the scope of the present disclosure is not limited to JSON format only. In some examples, other data interchange format and/or programming language may be used to represent or describe an element object.

In the example shown in FIG. 1, one or more element object (such as the element object 107 and the element object 109) may be grouped into an element collection 111. As used herein, the term "element collection" refers to a collective body of element objects.

In some examples, an element collection may correspond to a messaging communication. In some examples, when portions of an input message have different content types and/or are to be rendered with different visualization effects, each portion may be described or represented in a separate element object of the element collection.

For example, if the input string associated with a messaging communication is "Hello world!", where only "Hello" is to be rendered in bolding visualization effects, a group-based communication server in accordance with examples of the present disclosure may generate two element objects in an element collection, which may be described in the following programming code substantially in the form of JSON data interchange format:

```
{
    {type: "text", text: "Hello", style: {bold: true}},
    {type: "text", text: " world!"},
}
```

In other words, a group-based communication server may generate a new element object based on determining that the element style attribute changes, details of which are described further in connection with at least FIG. 13.

In some examples, the element collection 111 may comprise a corresponding element collection type attribute, which may indicate the corresponding type of the messaging communication that the element collection represents or describes. For example, the element collection type may be list collection, which may indicate that the corresponding messaging communication comprises bullet list and ordered list. As another example, the element collection type may be preformatted text collection, which may indicate that the corresponding messaging communication comprise triple backticks. As another example, the element collection type may be quote collection, which may indicate that the corresponding messaging communication comprise quotations. As another example, the element collection type may be text collection, which may indicate that the corresponding messaging communication comprise texts.

In the example shown in FIG. 1, one or more element collections (such as the element collection 111 and the element collection 113) may be grouped in to a block object 115. In such an example, the message object 100 may comprise the fallback object 117 and the block object 115. For example, the following is an example programming code describing an example message object, substantially in the form of JSON data interchange format:

```
{ // Message object
    text: "Hello world!", // Fallback text
    blocks: [
    {
    type: "rich_text", // A single Block Kit "rich_text" block to hold the text
    elements:    [
        {
        type: "rich_text_section",
                elements:      [
                    {type: "text ", text: "Hello", style:
                    {bold: true} },
                    {type: "text", text: " world!"},
                ]
        }
        ]
    }
    ]
}
```

In the present disclosure, the term "index object" refers to a data structure that may represent an electronic index associated with a messaging communication in a group-based communication system. Referring now to FIG. 2, an example index object 200 is shown.

In some examples, an index object may correspond to a message object. For example, as described above, each messaging communication may comprise metadata such as a message identifier. Accordingly, the corresponding message object and the corresponding index object may also comprise the message identifier. When the group-based communication server traverses index objects in response to a search query and identifies a corresponding index object, the group-based communication server may locate the corresponding message object based on the message identifier, example details of which are described in connection with at least FIG. 6, FIG. 7, FIG. 8, FIG. 9, FIG. 10A, and FIG. 10B.

In the example shown in FIG. 2, the example index object 200 may comprise one or more index strings (such as an index string 202 and an index string 204). In some examples, each of the one or more index strings may comprise text(s) or character(s) in plain text format corresponding to the messaging communication. In some examples, the index object 200 may be generated by a group-based communication server based on the message object 100, example details of which are described in connection with at least FIG. 11 and FIG. 12.

In some examples, an index string may comprise one or more indicators. For example, an index string may comprise a whitespace indicator, which may indicate a whitespace character in the text(s) or character(s) of the index string. As another example, an index string may comprise a channel identifier indicator, which may indicate a channel identifier in the text(s) or character(s) of the index string. As another example, an index string may comprise a user identifier indicator, which may indicate a user identifier in the text(s) or character(s) of the index string.

In the present disclosure, the term "group-based communication repository" refers to a data storage apparatus, such as a memory device, where one or more data objects associated with the group-based communication system are stored. The group-based communication repository may be a dedicated device and/or a part of a larger repository. The group-based communication repository may be dynamically updated or may be static. The group-based communication repository may be encrypted in order to limit unauthorized access of user activity data logs and associated engagement data.

In some examples, message objects associated with the group-based communication system may be stored in the group-based communication repository. In some examples, message objects associated with the group-based communication system may be stored in a database separate from the group-based communication repository.

In some examples, index objects associated with the group-based communication system may be stored in the group-based communication repository. In some examples, index objects associated with the group-based communication system may be stored in a database separate from the group-based communication repository.

In some examples, a user using a client device may cause one or more "search queries" to be generated by the client device and transmitted to the group-based communication server. The term "search query" refers a data object that may indicate a request for data retrieval from one or more databases. In some examples, a search query may comprise one or more search strings. The term "search string" may refer to one or more texts or characters that may comprise data retrieval criteria. For example, a "text search string" may comprise texts or characters based on which messaging communication that contains the texts or characters may be retrieved from a database. A "channel identifier search string" may comprise texts or characters that may represent a channel identifier based on which messaging communication that mentions the channel identifier may be retrieved from a database. A "user identifier search string" may comprise texts or characters that may represent a user identifier based on which messaging communication that mentions the user identifier may be retrieved from a database.

Example System Architecture for Implementing Embodiments of the Present Disclosure Methods, apparatuses, and computer program products of the present disclosure may be embodied by any of a variety of devices. For example, the method, apparatus, and computer program product of an example embodiment may be embodied by a networked device (e.g., a group-based communication system), such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 3 illustrates an example system architecture 300 within which embodiments of the present disclosure may operate. The system may comprise a repository (such as the group-based communication repository 307) and a server (such as a group-based communication server 309), details of which are described hereinafter.

Users may access a group-based communication system 305 via a communication network 303 using client devices 301A, 301B, ... 301N. The client devices 301A-301N may be a computing device as defined herein. Electronic data received by the group-based communication system 305 from the client devices 301A-301N may be provided in various forms and via various methods. For example, the client devices 301A-301N may include desktop computers, laptop computers, smartphones, netbooks, tablet computers, wearables, and the like.

In embodiments where a client device of client devices 301A-301N is a mobile device, such as a smart phone or tablet, the client device may execute an "app" to interact with the group-based communication system 305. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location service circuitry, wired and wireless network interfaces, user contacts, and other applications.

Additionally, or alternatively, the client devices 301A-301N may interact with the group-based communication system 305 via a web browser or through a web application that runs in a web browser. As yet another example, the client devices 301A-301N may include various hardware or firmware designed to interface with the group-based communication system 305.

The communication network 303 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 303 may include an 802.11, 802.16, 802.20, and/or WiMax network. Further, the communication network 303 may include a public network (such as the Internet), a private network (such as an intranet), or combinations thereof, and may utilize a variety of networking protocols including, but not limited to, TCP/IP based networking protocols. For instance, the networking protocol may be customized to suit the needs of the group-based communication system 305. In some embodiments, the protocol is a custom protocol of JSON objects sent via a Websocket channel. In some embodiments, the protocol is JSON over RPC, JSON over REST/HTTP, and the like.

In various embodiments of the present disclosure, data and information (such as but not limited to, messaging communication, search queries, etc.) may be sent to the group-based communication system 305 via, for example, the communication network 303 directly by a client device of client devices 301A-301N. Additionally, or alternatively, these data and information (such as but not limited to, messaging communication, search queries, etc.) may be sent to the group-based communication system 305 via one or more intermediaries.

For example, the client devices 301A-301N may transmit messages to the group-based communication system 305. In some examples, the message may include one or more message objects as described above. Additionally, or alternatively, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), a thread identifier, third party metadata, and/or the like. In one embodiment, one of the client devices 301A-301N may provide the following example messaging communication substantially in the form of a (Secure) Hypertext Transfer Protocol ("HTTP(S)") POST message including eXtensible Markup Language ("XML") formatted data, embodying a particular request for authenticating user account details to initiate an authenticated session, as provided below:

```
POST /authrequest.php HTTP/1.1
Host: www.server.com
Content-Type: Application/XML
Content-Length: 667
<?XML version = "1.0" encoding = "UTF-8"?>
<auth_request>
  <timestamp>2020-12-31 23:59:59</timestamp>
  <user_accounts_details>
      <user_account_credentials>
          <user_name>ID_user_1</user_name>
          <password>abc123</password>
          //OPTIONAL <cookie>cookieID</cookie>
          //OPTIONAL          <digital_cert_link>www.mydigitalcertificate.com/
JohnDoeDaDoeDoe@gmail.com/mycertifcate.dc</digital_cert_link>
          //OPTIONAL <digital_certificate>_DATA_</digital_certificate>
      </user_account_credentials>
```

```
</user_accounts_details>
<client_details> //iOS Client with App and Webkit
        //it should be noted that although several client details
        //sections are provided to show example variants of client
        //sources, further messages will include only one to save
        //space
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>app with webkit</client_app_type>
    <app_installed_flag>true</app_installed_flag>
    <app_name>nickname.app</app_name>
    <app_version>1.0 </app_version>
    <app_webkit_name>Mobile Safari</client_webkit_name>
    <client_version>537.51.2</client_version>
</client_details>
<client_details> //iOS Client with Webbrowser
    <client_IP>10.0.0.123</client_IP>
    <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
</client_details>
<client_details> //Android Client with Webbrowser
    <client_IP>10.0.0.123</client_IP>
    <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-
XXXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
</client_details>
<client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-
XXXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
</client_details>
<message>
    <message_identifier>ID_message_10</message_identifier>
    <team_identifier>ID_team_1</team_identifier>
    <channel_identifier>ID_channel_1</channel_identifier>
    <body contents>That is an interesting invention. I have attached a copy our patent
policy.</body contents>
    <attachments>patent_policy.pdf</attachments>
</message>
</auth_request>
```

In the example shown in FIG. 3, the group-based communication system 305 may comprise a group-based communication server 309 and a group-based communication repository 307.

The group-based communication repository 307 may be embodied as a data storage device such as a Network Attached Storage (NAS) device or devices, or as a separate database server or servers. The group-based communication repository 307 comprises information accessed and stored by the group-based communication server 309 to facilitate the operations of the group-based communication system 305. For example, the group-based communication repository 307 may include, without limitation, a plurality of requests, invitations, communications, user identifiers, external resource user identifiers, and the like organized within the group-based communication repository 307. For example, the group-based communication server 309 may provide electronic data relating to a user's interactions with the system, and the electronic data may be stored on the group-based communication repository 307. In some embodiments, the group-based communication repository 307 may be in communication with the group-based communication server 309 through the communication network 303. In some embodiments, the group-based communication repository 307 and the group-based communication server 309 may be contained in the group-based communication system 305.

In some embodiments, the group-based communication system 305 may be configured to include or be in communication with a user identification repository. The user identification repository may include identification data for one or more users. In some embodiments, the user identification repository may include user identifiers, channel identifiers, group identifiers, and the like. For example, the user identification repository may receive user profile information from the group-based communication server 309, and also receive additional identification data. In some embodiments, the user identification repository may be included in the same repository as the group-based communication repository 307.

In some examples, the group-based communication server 309 may create a storage message based upon the received message to facilitate message indexing and storage in a group-based communication repository 307. In some examples, the storage message may include one or more index objects described above. Additionally, or alternatively, the storage message may include data such as a message identifier, a group identifier, a group-based communication channel identifier, a sending user identifier, topics, responses, message contents, attachments, message hierarchy data, a thread identifier, third party metadata, conversation primitive data, and/or the like. For example, the group-based communication server 309 may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
```

-continued

```
<topics>
    <topic>inventions</topic>
    <topic>patents</topic>
    <topic>policies</topic>
</topics>
<responses>
    <response>liked by ID_user_2</response>
    <response>starred by ID_user_3</response>
</responses>
<contents>That is an interesting invention. I have attached a copy
our patent policy.</contents>
    <attachments>patent_policy.pdf</attachments>
    <conversation_primitive>
        conversation includes messages: ID_message_8,
ID_message_9, ID_message_10,
        ID_message_11, ID_message_12
    </conversation_primitive>
</storage_message>
```

In embodiments, a group-based communication channel identifier as defined above may be associated with the message. In embodiments, a sending user identifier as defined above may be associated with the message. In one implementation, the message may be parsed (e.g., using PHP commands) to determine a sending user identifier of the user who sent or posted the message to the group-based communication interface. In some embodiments, such sending user identifiers may correlate to target user identifiers in circumstances where an operating user is intending to view a series of messages posted by another user. Embodiments of the present invention would parse each message (e.g., using PHP commands) to identifier mentioned users (e.g., those @mentioned users) within the messages and those sending users as possible sources of target user identifiers for user identification queries as discussed in greater detail below.

Additionally, or alternatively, topics may be associated with the message. In one implementation, the message contents may be parsed (e.g., using PHP commands) to determine topics discussed in the message. For example, hashtags in the message may indicate topics associated with the message. In another example, the message may be analyzed (e.g., by itself, with other messages in a conversation primitive) or parsed using a machine learning technique, such as topic modeling, to determine topics associated with the message.

Additionally, or alternatively, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a MySQL database command similar to the following:

SELECT messageResponses
FROM MSM_Message
WHERE messageID=ID_message_10.

For example, data regarding responses to the message may be used to determine context for the message (e.g., a social score for the message from the perspective of an operating user). In another example, data regarding responses to the message may be analyzed to determine context regarding the user (e.g., the user's expertise in a topic may be determined based on the responses to the user's message regarding the topic).

Additionally, or alternatively, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

Additionally, or alternatively, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata.

Additionally, or alternatively, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the group-based communication channel) and/or proximity (e.g., message send order proximity, message send time proximity) of the messages.

Additionally, or alternatively, various metadata, determined as described above, and/or the contents of the message may be used to index the message (e.g., using the conversation primitive) to facilitate various facets of searching (i.e., search queries that return results from group-based communication repository 307). In one implementation, a storage message may be sent from group-based communication server 309 to facilitate indexing in group-based communication repository 307. In another implementation, metadata associated with the message may be determined and the message may be indexed in group-based communication repository 307. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes).

If there are attachments associated with the message, file contents of the associated files may be used to index such files in group-based communication repository 307 to facilitate searching. In one embodiment, the files may be indexed such that a company's or a group's files are indexed at a separate distributed repository.

It is noted that various components in the group-based communication server 309 may leverage the same computer or computing apparatus to perform various operations, and various components of the group-based communication repository 307 may leverage the same computer or computing apparatus to perform various operations.

Example Apparatus for Implementing Embodiments of the Present Disclosure

The group-based communication server 309 of FIG. 3 may be embodied by one or more computing systems, such as apparatus 400 shown in FIG. 4. The apparatus 400 may include a processor 402, a memory 404, an input/output circuitry 406, a communications circuitry 408, and a group-based communication circuitry 410. The apparatus 400 may be configured to execute the operations described above with respect to FIG. 3 and below with respect to FIGS. 6-15. Although these components 402-410 are described with respect to functional limitations, it should be understood that the particular implementations necessarily include the use of particular hardware. It should also be understood that certain of these components 402-410 may include similar or common hardware. For example, two sets of circuitries may both leverage use of the same processor, network interface, storage medium, or the like to perform their associated functions, such that duplicate hardware is not required for each set of circuitries.

In some embodiments, the processor 402 (and/or co-processor or any other processing circuitry assisting or otherwise associated with the processor) may be in communication with the memory 404 via a bus for passing information among components of the apparatus. The memory 404 is non-transitory and may include, for example, one or more volatile and/or non-volatile memories. In other words, for example, the memory 404 may be an electronic storage device (e.g., a computer-readable storage medium). The memory 404 may be configured to store information, data, content, applications, instructions, or the like for enabling the apparatus to carry out various functions in accordance with example embodiments of the present disclosure.

The processor 402 may be embodied in a number of different ways and may, for example, include one or more processing devices configured to perform independently. In some examples, the processor 402 may include one or more processors configured in tandem via a bus to enable independent execution of instructions, pipelining, and/or multi-threading. The use of the term "processor" or "processing circuitry" may be understood to include a single core processor, a multi-core processor, multiple processors internal to the apparatus, and/or remote or "cloud" processors.

In some examples, the processor 402 may be configured to execute instructions stored in the memory 404 or otherwise accessible to the processor 402. In some examples, the processor 402 may be configured to execute hard-coded functionalities. As such, whether configured by hardware or software methods, or by a combination thereof, the processor 402 may represent an entity (e.g., physically embodied in circuitry) capable of performing operations according to an embodiment of the present disclosure while configured accordingly. Alternatively, as another example, when the processor 402 is embodied as an executor of software instructions, the instructions may specifically configure the processor 402 to perform the algorithms and/or operations described herein when the instructions are executed.

In some embodiments, the apparatus 400 may include the input/output circuitry 406 that may, in turn, be in communication with the processor 402 to provide output to the user and, in some embodiments, to receive an indication of a user input. The input/output circuitry 406 may comprise a user interface circuitry and may include a display, which may comprise a web user interface, a mobile application, a client device, a kiosk, or the like. In some embodiments, the input/output circuitry 406 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 404, and/or the like).

The communications circuitry 408 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 408 may include, for example, a network interface for enabling communications with a wired or wireless communication network (such as the communication network 303 as shown in FIG. 3). For example, the communications circuitry 408 may include one or more network interface cards, antennae, buses, switches, routers, modems, and supporting hardware and/or software, or any other device suitable for enabling communications via a network. Additionally, or alternatively, the communications circuitry 408 may include the circuitry for interacting with the antenna/antennae to cause transmission of signals via the antenna/antennae or to handle receipt of signals received via the antenna/antennae.

The group-based communication circuitry 410 includes hardware configured to support various functionalities of a group-based communication system, details of which are described hereinafter. The group-based communication circuitry 410 may utilize processing circuitry, such as the processor 402, to perform these actions. In some embodiments, the group-based communication circuitry 410 may include a separate processor, specially configured Field Programmable Gate Array (FPGA), or Application Specific Integrated Circuit (ASIC). The group-based communication circuitry 410 may be implemented using hardware components of the apparatus configured by either hardware or software for implementing the functions described herein.

It is also noted that all or some of the information discussed herein can be based on data that is received, generated and/or maintained by one or more components of apparatus 400. In some embodiments, one or more external systems (such as a remote cloud computing and/or data storage system) may also be leveraged to provide at least some of the functionality discussed herein.

In some embodiments, other elements of the apparatus 400 may provide or supplement the functionality of particular circuitry. For example, the processor 402 may provide processing functionality, the memory 404 may provide storage functionality, the communications circuitry 408 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

The client devices 301A-301N of FIG. 1 may include one or more computing systems, such as the apparatus 500 shown in FIG. 5. The apparatus 500 may include a processor 501, a memory 503, an input/output circuitry 507, a communications circuitry 505, an input/output circuitry 507, and/or a display 509. The apparatus 500 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitries may both leverage use of the same processor, network interface, storage medium, or the like to perform their associated functions, such that duplicate hardware is not required for each set of circuitries. The use of the term "circuitry" as used herein with respect to components of the apparatus should therefore be understood to include particular hardware configured to perform the functions associated with the particular circuitry as described herein.

As described above, the term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 500 may provide or supplement the functionality of particular circuitry. For example, the processor 501 may provide processing functionality, the memory 503 may provide storage functionality, the communications circuitry 505 may provide network interface functionality, and the like.

In some embodiments, the processor 501 (and/or co-processor or any other processing circuitry assisting or otherwise associated with the processor) may be in communication with the memory 503 via a bus for passing information among components of the apparatus. The memory 503 may be non-transitory and may include, for example, one or more volatile and/or non-volatile memories. In other words, for example, the memory 503 may be an electronic storage device (e.g., a computer readable storage medium). The memory 503 may be configured to store information, data, content, applications, instructions, or the like, for enabling the apparatus 500 to carry out various functions in accordance with example embodiments of the present disclosure.

The processor 501 may be embodied in a number of different ways and may, for example, include one or more processing devices configured to perform independently. Additionally, or alternatively, the processor 501 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 501 may be configured to execute instructions stored in the memory 503 or otherwise accessible to the processor. Alternatively, or additionally, the processor 501 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 501 is embodied as an executor of software instructions, the instructions may specifically configure the processor to perform the algorithms and/or operations described herein when the instructions are executed.

In some embodiments, the apparatus 500 may include the input/output circuitry 507 that may, in turn, be in communication with the processor 501 to provide output to the user and, in some embodiments, to receive an indication of a user input. The input/output circuitry 507 may comprise an interface, a mobile application, a kiosk, or the like. In some embodiments, the input/output circuitry 507 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., the memory 503, and/or the like).

In some embodiments, the apparatus 500 may include the display 509 that may, in turn, be in communication with the processor 501 to display renderings of group-based communication user interfaces. In various examples of the present disclosure, the display 509 may include a liquid crystal display (LCD), a light-emitting diode (LED) display, a plasma (PDP) display, a quantum dot (QLED) display, and/or the like.

The communications circuitry 505 may be any means such as a device or circuitry embodied in either hardware or a combination of hardware and software that is configured to receive and/or transmit data from/to a network and/or any other device, circuitry, or module in communication with the apparatus 500. In this regard, the communications circuitry 505 may include, for example, a network interface for enabling communications with a wired or wireless communication network. For example, the communications circuitry 505 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

It is also noted that all or some of the information discussed herein can be based on data that is received, generated and/or maintained by one or more components of apparatus 500. In some embodiments, one or more external systems (such as a remote cloud computing and/or data storage system) may also be leveraged to provide at least some of the functionality discussed herein.

Example Methods for Implementing Embodiments of the Present Disclosure

Various methods described herein, including, for example, example methods as shown in FIGS. 6-15, may improve data retrieval in a group-based communication system.

It is noted that each block of the flowchart, and combinations of blocks in the flowchart, may be implemented by various means such as hardware, firmware, circuitry and/or other devices associated with execution of software including one or more computer program instructions. For example, one or more of the procedures described in FIGS. 6-15 may be embodied by computer program instructions, which may be stored by a non-transitory memory of an apparatus employing an embodiment of the present disclosure and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 6, an example method 600 is illustrated. In particular, the example method 600 illustrates example implementations of identifying a message object based on a search query in accordance with examples of the present disclosure.

The example method 600 may start at block 602. At block 604, a processing circuitry (such as the processor 402 of the group-based communication server 309 described above in connection with FIG. 3 and FIG. 4) may receive a search query comprising a search string.

In some examples, the search query may be received from a client device. For example, as shown in FIG. 3, one or more client devices 301A-301N may transmit one or more search queries to the group-based communication system 305 via the communication network 303.

In some examples, the search query may be generated based on a user input associated with the group-based communication user interface. For example, when the client device is a mobile device, the client device may execute an "app" to interact with the group-based communication system. The app may, for example, provide a group-based communication user interface that may include a search bar element that allows a user to input one or more search strings in the search bar. Based on the one or more search strings, the client device may generate a search query, and may transmit the search query to the group-based communication system.

In some examples, the client device may generate the search query based on an Application Programming Interface (API) of the group-based communication system. In some examples, the API may provide a set of interface and/or communication protocols between the group-based communication server and the client device, such that electronic data and information received by the group-based communication server from the client device may be decoded and interpreted by the group-based communication server. For example, an API may define information needed in the search query (for example, a user identifier associated with the user who provided the search string) in order for the group-based communication server to process the search query.

In some examples, the group-based communication server may parse the search query received from the client device to obtain the search string. For example, the group-based communication server may decode the search query based on the API to identify the search string associated with the search query.

At block 606, a processing circuitry (such as the processor 402 of the group-based communication server 309 described above in connection with FIG. 3 and FIG. 4) may identify an index object from a plurality of index objects based at least in part on the search string.

In some examples, the processing circuitry may traverse a plurality of index objects to identify the corresponding index object based on the search string. As described above, the processing circuitry may generate a plurality of index objects (each corresponding to a message object), and may store the plurality of index objects in a data repository. Subsequent to receiving the search query from the client device, the group-based communication server may traverse index objects in the data repository to identify the index object that corresponds to the search query.

In accordance with various examples of the present disclosure, various searching algorithms may be implemented to traverse the index objects and identify the corresponding index object based on the search query. For example, the processing circuitry may implement a sequential searching algorithm (such as linear search) and traverse the index objects sequentially and determine whether any of these index objects comprises an index string that is the same as the search string. As another example, the processing circuitry may implement an interval searching algorithm (such as binary search) and traverse the index objects by dividing the index objects into groups. In some examples, other searching algorithms may be used in addition to or in alternative of these searching algorithms mentioned above, including, but is not limited to, skip-lists, b-trees, and/or the like.

Referring now to FIG. 7 and FIG. 8, example implementations for block 606 of FIG. 6 (i.e. identifying an index object based at least in part on the search string) are illustrated. As shown in FIG. 7, the method 700 may start from block 701.

As described above, each index object may comprise one or more index strings. At block 703, a processing circuitry (such as the processor 402 of the group-based communication server 309 described above in connection with FIG. 3 and FIG. 4) may identify an index string from the one or more index strings of the plurality of index objects based at least in part on the search string.

Referring to the example as shown in FIG. 8, the example index object 804 may comprise a plurality of index strings. For example, the index object 804 may comprise an index string 808, which may correspond to a user mention element. As another example, the index object 804 may comprise an index string 810, which may correspond to an emoji element. As another example, the index object 804 may comprise an index string 812, which may correspond to a text element.

In the example shown in FIG. 8, the example search query 802 may comprise a search string having a string of text "cake." In other words, the example search query 802 indicates an electronic request to retrieve messaging communication in the group-based communication system that contains the word "cake." In some examples, the group-based communication server may implement searching algorithm described above to traverse the index strings and locate a corresponding index object that contains an index string having the same content as the search string.

As described above, a search string may be a text search string comprising texts or characters, and the corresponding search query may indicate an electronic request to identify messaging communication that contains the same text or characters as in the text search string, similar to those illustrated in FIG. 8. In some examples, the search query may indicate that the data retrieval is for whole word only. In other words, the search string must be presented in the messaging communication as a single and distinct element (for example, a whole word), instead of as a part of an element that may contain other parts. For example, the search query may indicate a whole word search for the word "cake", and messaging communication that contains the term "pancake" may not satisfy the search query.

To perform whole word search based on a text search string, a processing circuitry may analyze a first index string having a first index string portion that corresponds to the text search string, and may analyze an index string portion preceding the first index string portion, an index string portion following the first index string portion, an index string preceding the first index string, and/or an index string following the first index string. In some examples, in response to determining that the first index string portion is at least one of: preceded by a first whitespace indicator or followed by a second whitespace indicator, the processing circuitry may identify the first index string portion as corresponding to the text search string.

For example, the processing circuitry may identify that the first index string portion is the beginning portion of the index object based on determining that there is no index string or index string portion preceding the first index string portion. The processing circuitry may also identify a second index string or a second index string portion following the first index string portion. In response to determining that the first index string portion is followed by a whitespace indicator in the second index string or the second index string portion, the processing circuitry may identify that the first index string portion is a whole word that is the same as the text search string, and may identify the corresponding index object in response to the search query.

As another example, the processing circuitry may identify that the first index string portion is the ending portion of the index object based on determining that there is no index string or index string portion following the first index string portion. The processing circuitry may also identify a second index string or a second index string portion preceding the first index string portion. In response to determining that the first index string portion is preceded by a whitespace indicator in the second index string or the second index string portion, the processing circuitry may determine that the first index string portion is a whole word that is the same as the text search string, and may identify the corresponding index object in response to the search query.

As described above, a search string may be a user identifier search string, which may comprise texts or characters that may represent a user identifier based on which messaging communication that mentions the user identifier may be retrieved from a database. For example, the search query may comprise data indicating that the search query is for a user identifier, and the user identifier search string may be a string of characters corresponding to the user identifier.

To search user identifier mentioned in messaging communication based on a user identifier search string, the processing circuitry may analyze a first index string having a first index string portion that corresponds to the text search string, and may analyze an index string portion preceding the first index string portion and/or an index string preceding the first index string to determine whether there is a user identifier indicator.

For example, when generating index strings, the processing circuitry may prefix user identifier mentioned in the messaging communication with a "@" character. In this example, the "@" character corresponds to a user identifier indicator. The processing circuitry may identify that an index string portion comprises the same text as the user identifier search string (for example, Ser. No. 12/345,678). In response to determining that the index string portion is proceeded by the user identifier indicator, the processing circuitry may identify that the index string corresponds to the user identifier search string, and may identify the corresponding index object in response to the search query. If the index string portion is not proceeded by a user identifier indicator, the processing circuitry may identify that the index string does not represent a user identifier, and may not identify the corresponding index object.

As described above, a search string may be a channel identifier search string, which may comprise texts or characters that may represent a channel identifier based on which messaging communication that mentions the channel identifier may be retrieved from a database. For example, the search query may comprise data indicating that the search query is for a channel identifier, and the channel identifier search string may be a string of characters corresponding to the channel identifier.

To search channel identifier mentioned in messaging communication based on a channel identifier search string, the processing circuitry may analyze a first index string having a first index string portion that corresponds to the text search string, and may analyze an index string portion preceding the first index string portion and/or an index string preceding the first index string to determine whether there is a channel identifier indicator.

For example, when generating index strings, the processing circuitry may prefix channel identifier mentioned in the messaging communication with a "#" character. In this example, the "#" character corresponds to a channel identifier indicator. The processing circuitry may identify that an index string portion comprises the same text as the channel identifier search string (for example, Ser. No. 12/345,678). In response to determining that the index string portion is proceeded by a channel identifier indicator, the processing circuitry may identify that the index string corresponds to the channel identifier search string, and may identify the corresponding index object in response to the search query. If the index string portion is not proceeded by a channel identifier indicator, the processing circuitry may identify that the index string does not represent a channel identifier, and may not identify the corresponding index object.

Referring back to FIG. 7, subsequent to block 703, the method 700 may return to block 705 and ends. In some examples, block 705 of FIG. 7 may be prior to retrieving a message object based at least in part on the index object at block 608 of FIG. 6.

Referring back to FIG. 6, at block 608, a processing circuitry (such as the processor 402 of the group-based communication server 309 described above in connection with FIG. 3 and FIG. 4) may retrieve a message object based at least in part on the index object identified at block 606.

As described above, each index object may correspond to a message object. For example, when an index object is generated based on a message object (details of which are described herein), the processing circuitry may generate an index object identifier for the index object based on a message object identifier associated with the message object. As an example, the message object may correspond to a messaging communication, and the message object identifier may be the same as the message identifier of the messaging communication. In this example, the index object identifier may be the same as the message identifier of the messaging communication.

In some examples, index objects and message objects may be stored in the same repository in the group-based communication system. In some examples, index objects and message objects may be stored in different repositories within and/or external to the group-based communication system.

At block 610, a processing circuitry (such as the processor 402 of the group-based communication server 309 described above in connection with FIG. 3 and FIG. 4) may cause rendering of the message object received at block 608.

In some examples, the processing circuitry may transmit the message object to the client device, and may cause the message object to be rendered within a group-based communication user interface on the client device. As described above, the message object may comprise at least one element object having at least one element content attribute and at least one element style attribute. In some examples, the processing circuitry may cause the message object rendered based at least in part on the at least one element content attribute and the at least one element style attribute of the element object.

For example, as described above, the message object may comprise one or more element objects, where each element object may comprise an element content attribute and may, optionally, comprise an element style attribute. In some examples, the element style attribute may define visualization effects associated with the element content attribute of the element object.

As an example, the following is an example programming code describing at least a portion of an example message object that may be retrieved by the processing circuitry at block 608, substantially in the form of JSON data interchange format:

```
{
    {type: "text", text: "Hello", style: {bold: true}},
}
```

When causing rendering of the above example message object, the processing circuitry may cause the rendering of a text string "Hello" in bolding visualization effects on a group-based communication user interface.

Referring now to FIG. 9, FIG. 10A, and FIG. 10B, example implementations for block 610 of FIG. 6 are illustrated. In particular, FIG. 9, FIG. 10A, and FIG. 10B describes examples of rendering highlighted search results in a group-based communication user interface in accordance with examples of the present disclosure.

As shown in FIG. 9, the method 900 may start from block 901. At block 903, a processing circuitry (such as the processor 402 of the group-based communication server 309 described above in connection with FIG. 3 and FIG. 4) may identify an element content attribute of the message object retrieved at block 608 of FIG. 6 based at least in part on the first search string.

Referring to the example shown in FIG. 10A, the example message object 1004 may comprise a plurality of element objects, including an element object 1006, an element object 1008, an element object 1010, an element object 1012, an element object 1014, and an element object 1016. Each element object may comprise an element type attribute, an element content attribute, and/or an element style attribute. For example, the element object 1006 may comprise an element type attribute 1018, which may indicate that the element object 1006 corresponds to a user mention element. The element object 1006 may comprise an element content attribute 1020, which may provide the corresponding user identifier for the element object 1006. As another example, the element object 1008 may comprise an element type attribute 1022, which may indicate that the element object 1008 is a text element. The element object 1008 may comprise an element content attribute 1024, which may provide the corresponding content for the element object 1008. As another example, the element object 1010 may comprise an element type attribute 1026, which may indicate that the element object 1010 is an emoji element. The element object 1010 may comprise an element content attribute 1028, which may provide the corresponding canonical emoji name for the element object 1010. As another example, the element object 1012 may comprise an element type attribute 1030, which may indicate that the element object 1012 is a text element. The element object 1012 may comprise an element content attribute 1032, which may provide the corresponding content for the element object 1006. As another example, the element object 1014 may comprise an element type attribute 1034, which may indicate that the element object 1014 is a text element. The element object 1014 may comprise an element content attribute 1036, which may provide the corresponding content for the element object 1014. The element object 1014 may comprise an element style attribute 1038, which may define visualization effects for the element object 1014. As another example, the element object 1016 may comprise an element type attribute 1040, which may indicate that the element object 1016 is a text element. The element object 1016 may comprise an element content attribute 1042, which may provide the corresponding content for the element object 1016.

In the example shown in FIG. 10A, the search query 1002 may contain the search string "Cake." Based on the search query 1002, the processing circuitry may implement search algorithms described above, and may identify the element content attribute 1032 of the message object 1004 as at least a portion of the element content attribute 1032 contains the same text as the search query 1002.

In some examples, in response to determining that a first element content attribute in a first element object corresponds to the search string, the processing circuitry may further identify a second element content attribute in a second element object that precedes the first element object. For example, the processing circuitry may determine whether the second element content attribute comprises an end whitespace indicator, which may indicate a whitespace character between a second text string represented by the second element object and a first text string represented by the first element object. In response to determining that there is an end whitespace indicator, the processing circuitry may identify that the first element content attribute corresponds to the search string, and/or may cause rendering of the first message object based at least in part on the first element content attribute and the second element content attribute.

In some examples, the processing circuitry may identify the element content attribute at block 903 based on the type of search string (for example, text search string, user identifier search string, channel identifier search string, etc.), similar to those described above in connection with block 703 of FIG. 7.

Referring back to FIG. 9, at block 905, a processing circuitry (such as the processor 402 of the group-based communication server 309 described above in connection with FIG. 3 and FIG. 4) may generate an element style attribute in the message object retrieved at block 608 of FIG. 6. In some examples, the element style attribute may indicate highlight visualization effects for the element content attribute identified at block 903 of FIG. 9.

In some examples, the processing circuitry may insert the element style attribute to the element object having the element content attribute identified at block 903, such that, when the message object is rendered for display, the content of the message object may have highlight visualization effects.

As an example, if the element content in the following example element object (described in the following programming code substantially in the form of JSON data interchange format) is identified at block 903:

```
{
    {type: "text", text: "cake"},
}
```

Then the processing circuitry may generate an element style attribute "style: {highlight: true}" and may insert the element style attribute to the element object as follows:

```
{
    {type: "text", text: "cake", style: {highlight: true}}
}
```

When the above element object is rendered for display on a group-based communication user interface, the text "cake" may be highlighted to indicate that it is the same as the search string. In some examples, other visualization effects may be used in addition to highlight visualization effect. For example, the processing circuitry may generate an element style attribute "style: {bold:true, highlight: true}" and may insert the element style attribute to the element object as follows:

```
{
    {type: "text", text: "cake", style: {bold: true, highlight: true}}
}
```

When the above element object is rendered for display on a group-based communication user interface, the text "cake" may be bolded and highlighted to indicate that it is the same as the search string.

In some examples, the element content attribute identified at block 903 may be a first element content attribute comprising a first element content attribute portion and a second element content attribute portion, where only the first element content attribute portion corresponds to the search string and the second element content attribute portion does not correspond to the search string. For example, referring to FIG. 10A, the element content attribute 1032 may comprise two portions: "cake" and "of". In this example, only the former portion "cake" corresponds to the search query 1002 "cake."

In such examples, the processing circuitry may generate a second element content attribute based at least in part on the second element content attribute portion of the first element content attribute, and may remove the second element content attribute portion from the first element content attribute. In other words, the processing circuitry may "split" the corresponding element object identified at block 903 into two element objects: a first element object comprising an element content attribute corresponds to the search string, and a second element object comprising an element content attribute that does not correspond to the search string. An example is shown in FIG. 10B.

In the example shown in FIG. 10B, the processing circuitry may generate a second element object 1048. The second element object 1048 may comprise a second element content attribute 1058 ("of") based on the element content attribute portion that does not correspond to the search query 1002 ("cake") in the identified element content attribute 1032 ("cake of") as shown in FIG. 10A. The second element object 1048 may comprise an element type attribute 1056 that may indicate the type of the element object 1048 to be a text element.

The processing circuitry may extract the element content attribute portion ("cake") that corresponds to the search query 1002 ("cake") from the identified element content attribute 1032 ("cake of") shown in FIG. 10A, and may generate an updated element object 1046. In the updated element object 1046, the first element content attribute 1052 may comprise only the portion corresponding to the search query ("cake"). The updated element object 1046 may also comprise an element type attribute 1050, which may indicate that the updated element object 1046 is a text element. The updated element object 1046 may also comprise an element style attribute 1054, which may indicate highlight visualization effects for the element object 1046. In some examples, by extracting the element content attribute portion that corresponds to the search query, the remaining element content attribute portions that do correspond to the search query may be maintained.

In some examples, the processing circuitry may cause rendering of the message object 1044 based at least in part on the first element content attribute 1052 and second element content attribute 1058. For example, when the message object 1044 is rendered for display, only the text "cake" is highlighted in the group-based communication user interface to indicate the corresponding search string "cake," and the text "of" is not highlighted. As such, the method 900 may provide technical improvements in causing rendering of highlights on the correct portion(s) of messaging communication.

Referring back to FIG. 9, subsequent to block 905, the method 900 may return to block 907 and ends. In some examples, block 907 of FIG. 9 may be subsequent to block 610 of FIG. 6. Referring back to FIG. 6, the example method 600 may end at block 612.

The example method 600 described above in connection with FIG. 6 may provide various technical improvements on data retrieval in a group-based communication system. For example, by implementing an index object data structure for indexing messaging communications, it may take the group-based communication system less time in retrieving relevant messaging communications as compared to traversing message objects that comprise formatting data. Because message objects comprise formatting data associated with the messaging communication, the group-based communication system can still cause rendering of the messaging communications with their original visualization effects in the group-based communication user interface after a relevant message object is identified based on the index object.

Referring now to FIG. 11, an example method 1100 is illustrated. In particular, the example method 1100 illustrates example implementations of generating an index object based on a message object in accordance with examples of the present disclosure.

The example method 1100 may start at block 1101. At block 1103, a processing circuitry (such as the processor 402 of the group-based communication server 309 described above in connection with FIG. 3 and FIG. 4) may generate an index object corresponding to a message object.

In some examples, the message object may be retrieved from a client device (such as client devices 301A-301N described above in connection with FIG. 3) in communication with a group-based communication system (such as the group-based communication system 305 described above in connection with FIG. 3). In some examples, the message object may be retrieved from a data repository (such as the group-based communication repository 307 described above in connection with FIG. 3).

In some examples, the message object may comprise at least a first element object and a second element object. In some examples, the first element object may comprise a first element content attribute and a first element style attribute. In some examples, the second element object may comprise a second element content attribute and a second element style attribute.

For example, as shown in FIG. 12, the example message object may comprise a plurality of element objects, such as an element object 1204, an element object 1206, an element object 1208, an element object 1210, an element object 1212, and an element object 1214. Each of the plurality of element objects may comprise an element type attribute and an element content attribute. One or more element objects of the plurality of element objects may further comprise an element style attribute (for example, the element object 1212 as shown in FIG. 10).

In some examples, the processing circuitry may generate the index object based on element content attribute(s) associated with element object(s) in the message object. For example, the processing circuitry may generate the index object based at least in part on the first element content attribute and the second element content attribute described above.

In some examples, when generating the index object, the processing circuitry may not incorporate element style attribute(s) associated with element object(s) to the index object. In other words, the index object may not contain data or information that may define visualization effects associated with the element object(s).

In some examples, the processing circuitry may identify the type of element object (for example, based on the element type attribute) of the corresponding element object. Based on the type of element object, the processing circuitry may access the content attribute associated with the element object, and may process the content attribute for generating a corresponding index string of the index object. For example, when the element type attribute is "color," the processing circuitry may add a "#" label prior to the corresponding hex color code in the index string. As another example, when the element type attribute is "emoji," the processing circuitry may add a ":emoji_here" label in the corresponding index string. As another example, when the element type attribute is "link," the processing circuitry may add a corresponding link label, as well as a corresponding field indicator (for example, "website") in the corresponding index string.

For example, as shown in FIG. 12, the processing circuitry may generate an index object 1216 based on the element content attributes associated with the message object 1202. In some examples, the index object 1216 may comprise a plurality of index strings, and each index string may correspond to an element content attribute of an element object in the message object 1202. For example, the index string 1218 of the index object 1216 may correspond to the element content attribute of the element object 1204, the index string 1220 of the index object 1216 may correspond to the element content attribute of the element object 1206, the index string 1222 of the index object 1216 may correspond to the element content attribute of the element object 1208, the index string 1224 of the index object 1216 may correspond to the element content attribute of the element object 1210, the index string 1226 of the index object 1216 may correspond to the element content attribute of the element object 1212, and the index string 1228 of the index object 1216 may correspond to the element content attribute of the element object 1214.

Further, as shown in FIG. 12, the index object 1216 does not contain data or information that may define visualization effects associated with the element objects in the message object 1202.

Referring back to FIG. 11, at block 1105, a processing circuitry (such as the processor 402 of the group-based communication server 309 described above in connection with FIG. 3 and FIG. 4) may retrieve the message object based at least in part on the second index object corresponding to a second search string, similar to those described above in connection with at least block 608 of FIG. 6.

At block 1107, a processing circuitry (such as the processor 402 of the group-based communication server 309 described above in connection with FIG. 3 and FIG. 4) may cause rendering of the message object within the group-based communication user interface, similar to those described above in connection with at least block 610 of FIG. 6.

The example method 1100 may end at block 1109.

As illustrated in FIG. 11, the index object may be a "flattened" string that may only comprise texts of message communication without formatting data, and thus may have a smaller file size than a corresponding message object. The compact size of index object provides technical advantages in data indexing, as it may facilitates the group-based communication system in processing the search query and may reduce the time required for the group-based communication system to traverse the data objects.

Referring now to FIG. 13, an example method 1300 is illustrated. In particular, example method 1300 illustrate example implementations of generating an example message object in accordance with examples of the present disclosure.

The example method 1300 may start at block 1301.

At block 1303, a processing circuitry (such as the processor 402 of the group-based communication server 309 described above in connection with FIG. 3 and FIG. 4) may receive an input string. In some examples, the input string may be part of a messaging communication received from a client device (such as client devices 301A-301N described above in connection with FIG. 3). In some examples, the input string may comprise one or more character(s) or text(s), as described above.

In some examples, the input string may comprise a first word portion and a second word portion based on the structured format trigger(s) associated with characters in the input string. For example, characters in the first word portion may be associated with a structured format trigger, and characters in the second word portion may not be associated with any structured format trigger (or may be associated with a different structured format trigger).

In some examples, when the first word portion and the second word portion are combined, a whole word (i.e. a single distinct element in a messaging communication) may be formed. As an example, the input string may comprise the word "supernatural." The input string may comprise a first word portion "super" associated with a structured format trigger indicating bolding visualization effects, and a second word portion "natural" that is not associated with any visualization effects.

At block 1305, a processing circuitry (such as the processor 402 of the group-based communication server 309 described above in connection with FIG. 3 and FIG. 4) may generate a message object comprising a first element object and a second element object based on the input string.

As described above, a group-based communication server may generate a new element object based on determining that the element style attribute changes. Continuing from the above example, despite that "supernatural" may be deemed as one word, the group-based communication server may generate a first element object for "super" and a second element object for "natural," as the style attributes are different between these two portions.

In some examples, the first element object may comprise a first element content attribute corresponding to the first word portion and a first element style attribute based at least in part on the structured format trigger. In some examples, the second element object may comprise a second element content attribute corresponding to the second word portion.

Continuing from the above example, the processing circuitry may generate the following element objects described substantially in the form of JSON data interchange format:

```
{
    {type: "text", text: " super", style: {bold: true}},
    {type: "text", text: "natural "},
}
```

In the above example, the first element object ({type: "text", text: "super", style: {bold: true}}) may comprise a first element content attribute (text: "super") corresponding to the first word portion ("super"), and the second element object ({type: "text", text: "natural"}) may comprise a second element content attribute (text: "natural") based on the second word portion.

At block 1307, a processing circuitry (such as the processor 402 of the group-based communication server 309 described above in connection with FIG. 3 and FIG. 4) may cause rendering of the message object within the group-based communication user interface, similar to those described above in connection with at least block 610 of FIG. 6.

The example method 1300 may end at block 1309.

The example method 1100 described above in connection with FIG. 11 and the example method 1300 described above in connection with FIG. 13 may provide technical solutions for providing intra-word formatting rendering while maintaining an accurate index of messaging communication. Even the whole word may be broken down into multiple element objects, the group-based communication system may generate an index object by combining the element content attributes of these element objects (therefore re-creating the whole word). When the element objects are retrieved, the group-based communication system may still cause rendering of the original visualization effects based on the element style attributes of these element objects.

Referring now to FIG. 14, an example method 1400 is illustrated. In particular, the example method 1400 illustrates example implementations of generating a message object based on converting an input string associated with a markup-based structured format in accordance with examples of the present disclosure.

The example method 1400 may start at block 1402. At block 1404, a processing circuitry (such as the processor 402 of the group-based communication server 309 described above in connection with FIG. 3 and FIG. 4) may retrieve an input string associated with a markup-based structured format. In some examples, the input string may be part of a messaging communication received from a client device (such as client devices 301A-301N described above in connection with FIG. 3).

As described above, a markup-based structured format may enable defining input string features by integrating formatting symbols within input strings. For example, an input string associated with a markup-based structured format may comprise at least one text portion and at least one formatting symbol portion. An example of an input string associated with a markup-based structured format is presented below:

super*natural

In the above example, the input string may comprise a first text portion ("super") and a second text portion ("natural"). The input string may also comprise a pair of formatting symbol portions ("*").

At block 1406, a processing circuitry (such as the processor 402 of the group-based communication server 309 described above in connection with FIG. 3 and FIG. 4) may identify a structured format for the at least one text portion based on the at least one formatting symbol portion.

For example, when the formatting symbol portions comprise a pair of asterisk symbols ("*"), the processing circuitry may identify that the text portion between the asterisk symbols is associated with bolding visualization effects. When the formatting symbol portions comprise a pair of underscore symbols ("_"), the processing circuitry may identify that the text portion between the underscore symbols is associated with italic visualization effects. When the formatting symbol portions comprise a pair of tilde symbols ("~"), the processing circuitry may identify that the text portion between the tilde symbols is associated with strikethrough visualization effects.

At block 1408, a processing circuitry (such as the processor 402 of the group-based communication server 309 described above in connection with FIG. 3 and FIG. 4) may generate a message object based on the input string.

In some examples, the message object may comprise an element object comprising an element content attribute and an element style attribute. The element content attribute may correspond to the at least one text portion of the input string, and the element style attribute may be based at least in part on the structured format as determined at block 1406.

Continuing from the example above, the processing circuitry may identify that the text portion between the pair of asterisk symbols is associated with bolding visualization effects. The processing circuitry may generate the following element objects described substantially in the form of JSON data interchange format.

```
{
    {type: "text", text: "super", style: {bold: true}},
    {type: "text", text: "natural"},
}
```

In the above example, the message object may comprise two element objects. The first element object may correspond to the text portion of the input string comprising the characters "super," and the second element object may correspond to the text portion of the input string comprising the characters "natural." As shown in the example above, the first element object may comprise an element content attribute (text: "super") describing the text portion of the input string, as well as an element style attribute (style: {bold: true}) based on the structured format (bolding visualization effects) as indicated by the formatting symbol portion ("*") of the input string.

At block 1410, a processing circuitry (such as the processor 402 of the group-based communication server 309 described above in connection with FIG. 3 and FIG. 4) may cause rendering of the message object within the group-based communication user interface, similar to those described above in connection with at least block 610 of FIG. 6.

The example method 1400 may end at block 1412.

Referring now to FIG. 15, an example method 1500 in accordance with examples of the present disclosure is illustrated. In particular, the example method 1500 illustrates example implementations of generating a message object based on converting an input string associated with a serialization-based structured format in accordance with examples of the present disclosure.

The example method 1500 may start at block 1501. At block 1503, a processing circuitry (such as the processor 402 of the group-based communication server 309 described above in connection with FIG. 3 and FIG. 4) may retrieve an input string associated with a serialization-based structured format. In some examples, the input string may be part of a messaging communication received from a client device (such as client devices 301A-301N described above in connection with FIG. 3).

As described above, a serialization-based structured format may enable defining visualization features of input string data portions through generating feature arrays associated with input string data portions. For example, an input string associated with a serialization-based structured format may comprise at least one text portion and at least one feature-definition instruction. An example of an input string associated with a serialization-based structured format is presented below:

supernatural→(Style[Bold=True, Italics=False, Size=20])

In the above example, the input string may comprise a text portion ("supernatural"). The input string may also comprise a feature-definition instruction ("(Style[Bold=True, Italics=False, Size=20])").

At block 1505, a processing circuitry (such as the processor 402 of the group-based communication server 309 described above in connection with FIG. 3 and FIG. 4) may identify a structured format for the at least one text portion based on the at least one feature-definition instruction.

For example, the at least one feature-definition instruction may comprise true/false values for various visualization effects. When the value for a visualization effect is true, it indicates that text portion is to be rendered to have the corresponding visualization effect. When the value for a visualization effect is false, it indicates the text portion is to be rendered without the corresponding visualization effect.

Continuing from the example feature-definition instruction above (Style[Bold=True, Italics=False, Size=20]), the feature-definition instruction may indicate that the text portion is associated with a bolding visualization effects, is not associated with any italics visualization effects, and has a font size of 20 points.

At block 1507, a processing circuitry (such as the processor 402 of the group-based communication server 309 described above in connection with FIG. 3 and FIG. 4) may generate a message object based on the input string.

In some examples, the message object may comprise an element object comprising an element content attribute and an element style attribute. The element content attribute may correspond to the at least one text portion of the input string, and the element style attribute may be based at least in part on the structured format as determined at block 1505.

Continuing from the example above, the processing circuitry may identify that the text portion is associated with bolding visualization effects. The processing circuitry may generate the following element object described substantially in the form of JSON data interchange format.

```
{
    {type: "text", text: " supernatural", style: {bold: true}},
}
```

In the above example, the message object may comprise an element object. The element object may comprise an element content attribute (text: "supernatural") describing the text portion of the input string, as well as an element style attribute (style: {bold: true}) based on the structured format (bolding visualization effects) as indicated by the feature-definition instruction ((Style[Bold=True, Italics=False, Size=20])) of the input string.

At block 1509, a processing circuitry (such as the processor 402 of the group-based communication server 309 described above in connection with FIG. 3 and FIG. 4) may cause rendering of the message object within the group-based communication user interface, similar to those described above in connection with at least block 610 of FIG. 6.

The example method 1500 may end at block 1511.

Additional Implementation Details

To supplement the present disclosure, this application incorporates entirely by reference U.S. patent application Ser. No. 16/659,274, filed on Oct. 21, 2019.

Although example processing systems have been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. A computer-readable storage medium can be, or be included in, a computer-readable storage device, a computer-readable storage substrate, a random or serial access memory array or device, or a combination of one or more of them. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random-access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer needs not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., an LCD monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML (Hypertext Markup Language) page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as description of features specific to particular embodiments of particular disclosures.

Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus for improving data retrieval in a group-based communication platform, the apparatus comprising at least one processor and at least one non-transitory memory comprising a computer program code, the at least one non-transitory memory and the computer program code configured to, with the at least one processor, cause the apparatus to:
   receive, from a client device, a first search query comprising a first search string;
   identify a first index object of a plurality of index objects based at least in part on the first search string;
   retrieve a first message object comprising one or more element objects based at least in part on the first index object;
   create a modified message object by modifying at least a first element object of the one or more element objects such that the modified first element object comprises at least one element style attribute and a respective at least one element content attribute based at least in part on the first search string; and cause rendering of the modified message object within a group-based communication user interface on the client device based at least in part on the at least one element content attribute and the at least one element style attribute.

2. The apparatus of claim 1, wherein the at least one non-transitory memory and the computer program code are configured to, with the at least one processor, cause the apparatus to further:
parse the first search query to obtain the first search string.

3. The apparatus of claim 1, wherein the first index object comprises one or more index strings, wherein the at least one non-transitory memory and the computer program code are configured to, with the at least one processor, cause the apparatus to further:
identify a first index string from the one or more index strings based at least in part on the first search string.

4. The apparatus of claim 3, wherein the first search string is a text search string, wherein the first index string comprises a first index string portion corresponding to the text search string, wherein the at least one non-transitory memory and the computer program code are configured to, with the at least one processor, cause the apparatus to further:
in response to determining that the first index string portion is at least one of: preceded by a first whitespace indicator or followed by a second whitespace indicator, identify the first index object as corresponding to the first search string.

5. The apparatus of claim 3, wherein the first search string is a user identifier search string, wherein the first index string comprises a first index string portion corresponding to the user identifier search string, wherein the at least one non-transitory memory and the computer program code are configured to, with the at least one processor, cause the apparatus to further:
in response to determining that the first index string portion is preceded by a first user identifier indicator, identify the first index object as corresponding to the first search string.

6. The apparatus of claim 3, wherein the first search string is a channel identifier search string, wherein the first index string comprises a first index string portion corresponding to the channel identifier search string, wherein the at least one non-transitory memory and the computer program code are configured to, with the at least one processor, cause the apparatus to further:
in response to determining that the first index string portion is preceded by a first channel identifier indicator, identify the first index object as corresponding to the first search string.

7. The apparatus of claim 1, wherein the at least one non-transitory memory and the computer program code are configured to, with the at least one processor, cause the apparatus to further:
identify a first element content attribute of the first message object based at least in part on the first search string; and
generate a first element style attribute in the first message object, wherein the first element style attribute indicates highlight visualization effects for the first element content attribute.

8. The apparatus of claim 7, wherein the first element content attribute comprises a first element content attribute portion and a second element content attribute portion, wherein the first element content attribute portion corresponds to the first search string, wherein the at least one non-transitory memory and the computer program code are configured to, with the at least one processor, cause the apparatus to further:
generate a second element content attribute based at least in part on the second element content attribute portion of the first element content attribute;
remove the second element content attribute portion from the first element content attribute; and
cause rendering of the first message object based at least in part on the first element content attribute and the second element content attribute.

9. The apparatus of claim 7, wherein the at least one non-transitory memory and the computer program code are configured to, with the at least one processor, cause the apparatus to further:
identify a second element content attribute that precedes the first element content attribute in the first message object; and
in response to determining that the second element content attribute comprises an end whitespace indicator, cause rendering of the first message object based at least in part on the first element content attribute and the second element content attribute.

10. The apparatus of claim 1, wherein the at least one non-transitory memory and the computer program code are configured to, with the at least one processor, cause the apparatus to further:
generate a second index object corresponding to a second message object based at least in part on a first element content attribute and a second element content attribute associated with the second message object, wherein the second message object comprises a first element object and a second element object, wherein the first element object comprises the first element content attribute and a first element style attribute, wherein the second element object comprises the second element content attribute and a second element style attribute;
retrieve the second message object based at least in part on the second index object corresponding to a second search string; and
cause rendering of the second message object within the group-based communication user interface.

11. The apparatus of claim 1, wherein the at least one non-transitory memory and the computer program code are configured to, with the at least one processor, cause the apparatus to further:
receive, from the client device, an input string comprising a first word portion and a second word portion, wherein the first word portion is associated with a structured format trigger;
generate, based on the input string, a second message object comprising a first element object and a second element object, wherein the first element object comprises a first element content attribute corresponding to the first word portion and a first element style attribute based at least in part on the structured format trigger, wherein the second element object comprises a second element content attribute corresponding to the second word portion; and
cause rendering of the second message object within the group-based communication user interface based at least in part on the first element style attribute.

12. The apparatus of claim 1, wherein the at least one non-transitory memory and the computer program code are configured to, with the at least one processor, cause the apparatus to further:

retrieve an input string associated with a markup-based structured format, wherein the input string comprises at least one text portion and at least one formatting symbol portion;

identify a structured format for the at least one text portion based on the at least one formatting symbol portion;

generate, based on the input string, a second message object comprising a first element object, wherein the first element object comprises a first element content attribute and a first element style attribute, wherein the first element content attribute corresponds to the at least one text portion, wherein the first element style attribute is based at least in part on the structured format; and cause rendering of the second message object within the group-based communication user interface based at least in part on the first element style attribute.

13. The apparatus of claim 1, wherein the at least one non-transitory memory and the computer program code are configured to, with the at least one processor, cause the apparatus to further:

retrieve an input string associated with a serialization-based structured format, wherein the input string comprises at least one text portion and at least one feature-definition instruction;

identify a structured format for the at least one text portion based on the at least one feature-definition instruction;

generate, based on the input string, a second message object comprising a first element object, wherein the first element object comprises a first element content attribute and a first element style attribute, wherein the first element content attribute corresponds to the at least one text portion, wherein the first element style attribute is based at least in part on the structured format; and cause rendering of the second message object within the group-based communication user interface based at least in part on the first element style attribute.

14. A computer-implemented method for improving data retrieval m a group-based communication platform, comprising:

receiving, from a client device, a first search query comprising a first search string;

identifying a first index object of a plurality of index objects based at least in part on the first search string;

retrieving a first message object comprising one or more element objects based at least in part on the first index object;

creating a modified message object by modifying at least a first element object of the one or more element objects such that the modified first element object comprises at least one element style attribute and a respective at least one element content attribute based at least in part on the first search string; and causing rendering of the modified message object within a group-based communication user interface on the client device based at least in part on the at least one element content attribute and the at least one element style attribute.

15. A computer program product comprising at least one non-transitory computer-readable storage medium having computer-readable program code portions stored therein, the computer-readable program code portions comprising an executable portion configured to:

receive, from a client device, a first search query comprising a first search string;

identify a first index object of a plurality of index objects based at least in part on the first search string;

retrieve a first message object comprising one or more element objects based at least in part on the first index object;

create a modified message object by modifying at least a first element object of the one or more element objects such that the modified first element object comprises at least one element style attribute and a respective at least one element content attribute based at least in part on the first search string; and cause rendering of the modified message object within a group-based communication user interface on the client device based at least in part on the at least one element content attribute and the at least one element style attribute.

* * * * *